(12) United States Patent
Al-Kofahi et al.

(10) Patent No.: US 11,386,510 B2
(45) Date of Patent: Jul. 12, 2022

(54) METHOD AND SYSTEM FOR INTEGRATING WEB-BASED SYSTEMS WITH LOCAL DOCUMENT PROCESSING APPLICATIONS

(75) Inventors: Khalid Al-Kofahi, Rosemount, MN (US); Marc Noel Light, St. Paul, MN (US); Joel Aaron Hurwitz, Eagan, MN (US)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 0 days.

(21) Appl. No.: 12/806,119

(22) Filed: Aug. 5, 2010

(65) Prior Publication Data
US 2012/0036125 A1    Feb. 9, 2012

(51) Int. Cl.
| | |
|---|---|
| *G06F 16/00* | (2019.01) |
| *G06Q 50/18* | (2012.01) |
| *G06Q 10/10* | (2012.01) |
| *G06F 16/332* | (2019.01) |

(52) U.S. Cl.
CPC .......... *G06Q 50/18* (2013.01); *G06F 16/332* (2019.01); *G06Q 10/10* (2013.01)

(58) Field of Classification Search
CPC .. G06Q 10/10; G06Q 50/18; G06F 17/30637; G06F 16/332
See application file for complete search history.

(56) References Cited

U.S. PATENT DOCUMENTS

| | | |
|---|---|---|
| 5,287,278 A | 2/1994 | Rau |
| 7,003,719 B1 | 2/2006 | Rosenoff |
| 7,124,031 B1 | 10/2006 | Hoffman |
| | (Continued) | |

OTHER PUBLICATIONS

PCT International Search Report, PCT/US11/01391, dated Dec. 19, 2011, 10 pgs.

(Continued)

*Primary Examiner* — Dinku W Gebresenbet
(74) *Attorney, Agent, or Firm* — Duncan Galloway Greenwald PLLC; Kevin T. Duncan

(57) ABSTRACT

The present invention provides a method and system and software that allow users to readily access online legal research tools, while using other applications, such as word processors. One exemplary computer-implemented system provide an add-on software framework that integrates into a host word-processing application on a client access device. The add-on software framework allows users to select from an expandable listing of one or more web applications on a web server, with each of the web application capable of controlling operation of the host word processing application. The web applications facilitate extraction and access to information from the information-retrieval services as well as secondary source reference texts and incorporation of the information in the document or in metadata associated with the document. The present invention allows seamless user experience across host application, such as traditional word processing applications, and Information Service Providers (ISP), such as legal research database and searching tools, and Secondary sources, such as reference texts related to primary source documents, e.g., case law and statues, associated with the ISP service.

33 Claims, 27 Drawing Sheets

(56) References Cited

U.S. PATENT DOCUMENTS

| | | | |
|---|---|---|---|
| 7,333,966 B2 | 2/2008 | Dozier | |
| 7,630,947 B2 | 12/2009 | Pandya | |
| 2003/0130837 A1* | 7/2003 | Batchilo et al. | 704/9 |
| 2003/0135826 A1 | 7/2003 | Dozier | |
| 2003/0154208 A1 | 8/2003 | Maimon | |
| 2004/0210443 A1 | 10/2004 | Kuhn | |
| 2005/0102259 A1 | 5/2005 | Kapur | |
| 2005/0131935 A1* | 6/2005 | O'Leary et al. | 707/102 |
| 2005/0234968 A1* | 10/2005 | Arumainayagam et al. | 707/102 |
| 2006/0052945 A1 | 3/2006 | Rabinowitz | |
| 2006/0195430 A1* | 8/2006 | Arumainayagam et al. | 707/3 |
| 2006/0253274 A1 | 11/2006 | Miller | |
| 2006/0277168 A1 | 12/2006 | Hammond et al. | |
| 2007/0005578 A1 | 1/2007 | Patman | |
| 2007/0130100 A1* | 6/2007 | Miller | G06F 17/30014 707/999.001 |
| 2007/0276854 A1 | 11/2007 | Gold | |
| 2008/0033929 A1* | 2/2008 | Al-Kofahi | G06F 17/30722 707/999.005 |
| 2009/0076836 A1* | 3/2009 | Arvidson | G06Q 50/18 705/311 |
| 2009/0187567 A1 | 7/2009 | Rolle | |
| 2009/0198674 A1* | 8/2009 | Custis et al. | 707/5 |
| 2009/0222395 A1 | 9/2009 | Light et al. | |
| 2010/0030749 A1* | 2/2010 | Dahn | G06F 17/30637 707/706 |
| 2011/0047156 A1* | 2/2011 | Knight | G06F 17/30705 707/737 |

OTHER PUBLICATIONS

Jon Espen Ingvaldsen et al, "Financial News Mining: Monitoring Continuous Streams of Text", Web Intelligence, 2006. WI 2006.

International Search Report, PCT/US2008/088040, dated Feb. 6, 2009.

David Nadeau, "A survey of named entity recognition and classification".

Rau L F Ed—IEEE: "Extracting company names from text", Proceedings of Conference on AI Applications, Miami Beach, Feb. 24-28, 1991.

Ing Xiao et al: "A global rule induction approach to information extraction", Proceedings 15th IEEE International Conference on Tools with Artificial Intelligence. ICTAI 2003.

Teresa Chung, et al., "Identifying Technical Vocabulary", System vol. 32, 2004 pp. 251-263.

Christopher Dozier, et al., "Automatic Extraction and Linking of Person Names in Legal Text", Proceedings of RIAO, Apr. 2000, p. 1305-132.

Yang Huizhong, "A new technique for identifying scientific/technical terms and describing science texts", Journal of ASsoc for Literary and Linguistic Comp., vol. 1 pp. 93-103.

\* cited by examiner

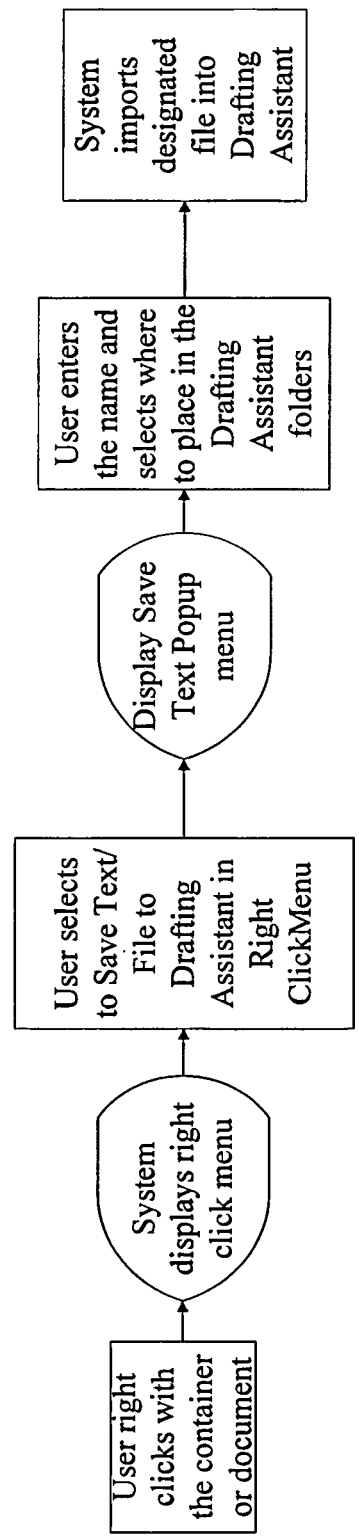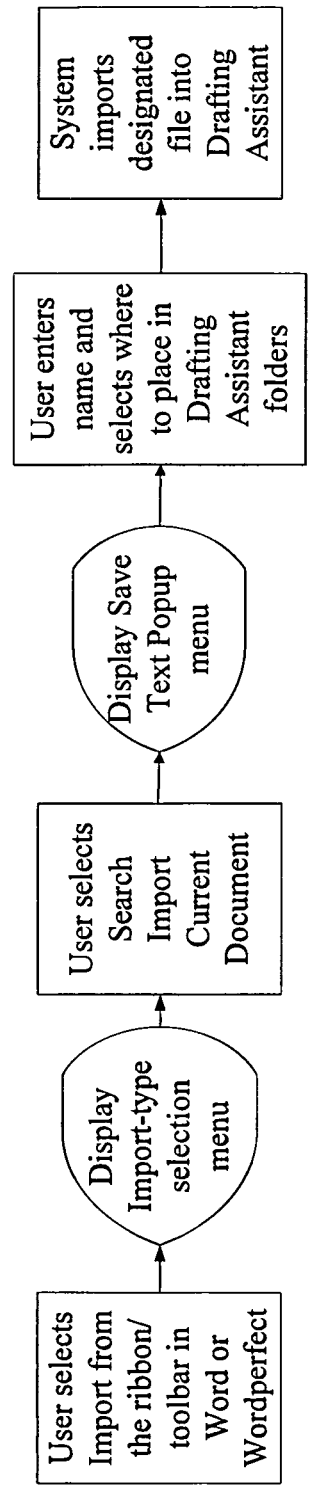
FIGURE 14A
FIGURE 14B

West Solutions — Select Product ▼

1234-5678 ▼     📄 Report ▾

Templates / Model Documents ⌃
- ⊖ ◯ Model Documents
  - ◯ Briefs
  - ◯ Letters
  - ◯ Motions
- ◯ Language
- ⊖ ◯ West Templates

Transcripts ⌄

Documents ⌄

Pleadings ⌄

Research ⌄

---

View: ▯ ▯ ▯     ➡ Send

Search Results ✕

Results: 100 Documents    ✉ Email   🖨 Print   ⬇ Download   📤 Export

Edit Search | Locate In Result

☞ SELECT TO PRINT, EMAIL, ETC.

☐ ⁑ 1. Cameron & Willacy Counties Community Projects, Inc. v. Gonzalez,
614 S.W.2d 585, Tex.Civ.App.-Corpus Christi, March 05, 1981 (NO. 1675)

...No. 1675. March 5, 1981. Rehearing Denied April 9, 1981. Terminated employee of nonprofit corporation brought action against the corporation alleging wrongful termination of employment and defamation of character. The 103rd District Court, Cameron County......

Figure 20

METHOD AND SYSTEM FOR INTEGRATING WEB-BASED SYSTEMS WITH LOCAL DOCUMENT PROCESSING APPLICATIONS

FIELD OF THE INVENTION

The present invention relates generally to natural language processing, information retrieval and more particularly to determining relevancy of terms within documents in the context of searching for authority, such as legal authority, and in facilitating the generation of documents, such as legal briefs. The invention relates to determine how relevant or important terms or aspects are to documents and in particular to the content of that document. Also, the invention relates to processes, software and systems for use in delivery of services related to the legal, corporate, and other professional sectors and more particularly delivery of such services in connection with a subscriber's work function, e.g., preparing documents in a word processing environment and application. The invention relates to a system that presents searching functions to users, such as subscribers to a professional services related service, processes search terms and applies search syntax across document databases, and displays search results generated in response to the search function and processing.

BACKGROUND OF THE INVENTION

With the advents of the printing press, typeset, typewriting machines, computer-implemented word processing and mass data storage, the amount of information generated by mankind has risen dramatically and with an ever quickening pace. As a result there is a continuing and growing need to collect and store, identify, track, classify and catalogue for retrieval and distribution this growing sea of information.

In many areas and industries, including the financial and legal sectors and areas of technology, for example, there are content and enhanced experience providers, such as The Thomson Reuters Corporation. Such providers identify, collect, analyze and process key data for use in generating content, such as law related reports, articles, etc., for consumption by professionals and others involved in the respective industries, e.g., lawyers. Providers in the various sectors and industries continually look for products and services to provide subscribers, clients and other customers and for ways to distinguish their firms over the competition. Such providers strive to create and provide enhance tools, including search and ranking tools, to enable clients to more efficiently and effectively process information and make informed decisions.

In particular, for example, judges and lawyers within the American legal system, as well as many others across the globe, are continually researching an ever-expanding body of legislation and judicial opinions to assist them understanding and resolving new or potential disputes. To facilitate this research, companies, such as West Publishing Company of St. Paul, Minn. (doing business as Thomson West), collect legal statutes, judicial opinions, law articles, and other legal and non-legal materials and make these available electronically over a computer network, through the Westlaw® online research system. (Westlaw is a trademark licensed to Thomson West.) At least one problem the present inventors recognized with this powerful system as well as other online research systems is that their valuable functionality is highly segregated from the functionality of other computer applications. For instance, legal researchers typically use results of their online legal research as part of a larger process of producing documents, such as legal briefs and memorandum. However, systems, such as the Westlaw system, are typically functionally separated from popular word processing applications, such as Microsoft Word or Corel WordPerfect, that are used for creating these documents.

For example, with advancements in technology and sophisticated approaches to searching across vast amounts of data and documents, e.g., database of issued court decisions, law review articles, statutes and laws, regulations, etc., professionals and other users increasingly rely on mathematical models and algorithms in making professional and business determinations. In addition, there are known tools, such as word processing applications, e.g., Corel's WordPerfect® and Microsoft's Word®, and systems available to professionals and others for preparing work product, such as legal briefs, court decisions, etc. There are also known systems, e.g., Thomson Reuter's Knowledge Management, that allow users to automatically access Information Service Provider (ISP) networks or websites, such as over the Internet, and that perform functions based on text included in a document being created or edited on a word processing system. For example, if a legal brief or memorandum includes citations to legal authority, such as case law or statutes, the user's system can interface with an ISP's service to check proper citation form and to check on the status of the relied on authority to confirm that the statute has not been revised or repealed or that a case has not been reversed or otherwise called into question. Systems may include an applet or application executing locally on the user's computer that interfaces with the ISP network-based system.

Although adds-ons such as West BriefTools™ software and WestCiteLink® software are available to identify, mark, verify, tabulate, link, and/or indicate status of legal citations in word processor documents, their functionality is isolated to legal citations. This means that for other types of legal informational needs users must leave the context of the word processing application to execute searches via browsers or other search tools and then cut and paste information from their browsers or other search interfaces into the documents. Moreover, the inventors recognized that conventional techniques for expanding the functionality of word processing applications using customized add-ons requires adding fully customized software to the computer hosting the word processing application. This approach, however, is inefficient an information services company, such as Thomson Reuters, wants to offer a growing set of add-ons, such as West BriefTools and WestCiteLink software, to its customers.

In one known system, Thomson Reuter's Knowledge Management, an application runs locally at a user's computer or access device that is operating a word processor application and automatically, such as by a user manipulating via a user interface screen, accesses the ISP service over a network connection, e.g., the Internet. The ISP then applies one or more search engines across one or more databases to retrieve documents in response to terms identified in the user-created document or user defined queries or search terms. The search engine(s) compare the terms that appear in the document (e.g., "summary judgment") to arrive at a set of one or more documents within a database or network of databases for presenting to the user. The system may also perform a series of enhanced functions to rank or otherwise score or present the documents to the user. The system may use functions such as Term Frequency-Inverse Document Frequency (TFIDF) in comparing terms appearing in a document against a collection of documents.

Although existing ISP search engines (SE) can be used to search for non-standard terms and strings, because they are limited to case law a single layer search is often ineffective or at least less effective when dealing with such terms. For instance, existing ISP SEs are likely to find zero or few relevant cases on an issue represented in non-standard form or terms. The known systems suffer from the disadvantage of being less effective when dealing with uncommon or non-standard terms or expression and, therefore, fail to identify and present documents, e.g., case law, that would otherwise being helpful and of interest as being related to the uncommon or non-standard terms used by the user in the user-created document.

SUMMARY OF THE INVENTION

To address this and/or other needs, the present inventors devised, among other things, systems, methods, and software that allow users to readily access additional informational resources, such as online legal research tools, while using other applications, such as word processors. The invention is directed to providing a seamless user experience in connecting functions between word processing applications and ISP searching and research services. The invention provides an additional layer of searching over the prior art and an enhanced searching capability to ascertain and present documents responsive to text or terms appearing in a user's working document that may not match perfectly or neatly in the manner generally presented in relevant case law, statutes and the like. Often the situation arises where a user uses loose terms or expression or may not know the exact term of art or phrase or legal standard that applies in researching or writing about a particular issue.

The invention may be used in connection with searching based on known terms but is particularly powerful when a user uses terms not traditionally used in connection with an issue or a subject, e.g., "everyone agrees to the underlying events" as opposed to "no genuine issue of material fact" in the context of summary judgment proceedings. The invention provides the enhanced feature of searching not only primary sources, e.g., case law and statute databases, but also searches secondary sources of collections or sets of referencing texts to identify and present case law relevant to an issue being researched. "Referencing text documents" included in Reference Text Collections or Sets (RTC or RTS), e.g., ALR, are documents that are not part of the body of law or direct legal authority but that do cite to case law, statutes, regulations and other legal authorities. The invention processes the search criteria to yield a responsive set of referencing text documents from the RTC based on a user search request or query, such as may be highlighted or otherwise derived from a working document operating in a word processor application by the user. The responsive set of referencing text documents are identified by matching search terms or criteria with text appearing in the referencing text documents that is associated with case law cited in the referencing text documents.

The system identifies those citations related to the highlighted or search terms found in the referencing text documents to yield a set of "referencing text results", which is a set of case law cited in the referencing text documents. Accordingly, the invention generates a set of search results comprised of two sets of case law for presenting to a user on a subject of interest. The first set of case law is generated by performing the search on the primary case law database and the second set of case law is generated based on the citations contained in the set of referencing text documents that relates to the user search request. In this manner, the invention provides a seamless integration of searching functions and database resources from the word processor environment that includes not only primary case law but also secondary sources of non-case law. Accordingly, when searching from the word processing environment for terms or highlighted statement contained within a working document, the invention provides an additional layer of searching in addition to traditional ISP systems and provides an enhanced way of searching for responsive legal authority based on terms not traditionally used and that appear in secondary sources, e.g., ALR. The system provides searching in both the primary and the secondary sources and presents responsive case law from the primary source and case law that is cited in responsive referencing text documents. In addition, the system may rank, together or separately, the two sets of case law, the primary search results from the primary database of case law and the set of referencing text results. The system may also reduce, such as through a de-duplication process, the set of search results or the component search results. The system may display to the user the respective responsive search results either combined or separated. The set or search results are then available for user examination and may be incorporated into the working document.

One exemplary computer-implemented system provides an add-on software framework that integrates into a host word processing application on a client access device. In essence the invention provides a web-based control of or interaction with desktop applications. The add-on software framework allows users to select from one or more web applications on a web server, with each of the web application capable of controlling operation of the host word processing application (via appropriate APIs and an embedded browser control with framework). The web applications facilitate access to information from the information-retrieval services and incorporation of the information in the document or in metadata associated with the document. The invention further provides an enhanced experience by providing a system that automatically or semi-automatically derives information associated with user documents in a word processing environment of not only access an ISP collection of search tools and documents but also utilize secondary source of documents, e.g., ALR, AmJur, Headnotes, law review articles, in confirming legal authority and in presenting argument in work product, such as legal briefs and decisions.

In a first embodiment, the invention provides a computer useable medium having a set of executable code for enabling electronic communications between a word processing program of a client access device and an information services provider system (ISP). The set of executable code comprises the following sets of computer program code executable by the processor. A first set of computer program code for operatively connecting to the word processing program. A second set of computer program code for operatively connecting to the information services provider system. A third set of computer program code for accepting a user search request initiated by a user of the word processing program. A fourth set of computer program code for transmitting the user search request to the information services provider system. A fifth set of computer program code for receiving a set of search results, the set of search results comprising a set of referencing text results. A sixth set of computer program code for displaying within the word processing program at least a portion of the set of referencing text results. In addition, the third set of computer program code may comprise code for identifying a highlighted portion of text within the word processing program. Also the word processing program may be either Microsoft Word or Corel WordPerfect. Also, the set of referencing text results preferably comprises case law and the set of search results comprises a primary set of case law results derived from an ISP case law database. In addition, the computer useable medium may further comprise a computer program code for combining the set of referencing text results and the primary set of case law results. The computer useable medium may comprise a memory within the information services provider system and further comprise a seventh set of computer program code for receiving from the ISP the first set of computer program code, the second set of computer program code, the third set of computer program code, the fourth set of computer program code, the fifth set of computer program code, and the sixth set of computer program code at the client access device; and an eighth set of computer program code for installing at the client access device the first set of computer program code, the second set of computer program code, the third set of computer program code, the fourth set of computer program code, the fifth set of computer program code, and the sixth set of computer program code on the client access device.

In a second embodiment, the invention provides a computer-implemented method for enabling electronic communications between a word processing program operating on a client access device and a computer-based information services provider system (ISP). The method comprises the following steps of operatively connecting to a word processing program operating on a client access device; operatively connecting to an ISP; accepting a user search request initiated by a user of the word processing program; transmitting the user search request to the ISP; receiving a set of search results, the set of search results comprising a set of referencing text results; and receiving for display within a user interface of the word processing program at least a portion of the set of referencing text results. In addition, the step of accepting a user search request may comprise identifying a highlighted portion of text within a document associated with the word processing program. The method may further comprise receiving from the ISP a set of computer program code at the client access device, the set of computer program code adapted to execute on the client access device to perform in whole or in part the steps of (a)-(f); and installing the set of computer program code on the client access device.

In yet a third embodiment, the invention provides a client access, such as a computer. The device includes: a processor adapted to execute code; a memory for storing executable code; a word processing program executed by the processor; means for establishing electronic communications with an information services provider system (ISP) having a first database having a primary set of documents; a first set of computer program code for operatively connecting to the word processing program; a second set of computer program code for operatively connecting to the information services provider system; a third set of computer program code for accepting a user search request initiated by a user of the word processing program; a fourth set of computer program code for transmitting the user search request to the information services provider system; a fifth set of computer program code for receiving a set of search results, the set of search results comprising a set of referencing text results; and a sixth set of computer program code for receiving for display within a user interface of the word processing program at least a portion of the set of referencing text results. In one manner, the device displays within a user interface of the word processing program at least a subset of the primary set of documents and at least a portion of the set of referencing text results. Moreover, the displayed sets may be ranked with respect to relevancy to data associated with the user search request at least a portion of one or both of the primary set of documents and the set of referencing text results. Also, the referencing text results may comprise case law derived from case citations contained in non-case law referencing text documents identified in a database other than the first database.

In yet another embodiment the present invention provides a network-based, computer-implemented information services provider system (ISP) having a set of executable code for enabling data exchange with a word processing program remotely operating on a client access device, the system comprising: a processor adapted to execute code; a memory for storing executable code; a first database accessible by the processor and having stored therein a primary set of documents; a first set of computer program code adapted to operatively connect to the word processing program; a second set of computer program code adapted to receive search data associated with a user search request initiated by a user of the word processing program; a third set of computer program code adapted to generate a set of search results, the set of search results comprising a set of primary search results from the first database and a set of referencing text results derived from a database other than the first database; and a fourth set of computer program code adapted to transmit for display within a user interface of the word processing program at least a portion of the set of search results including at least a portion of the set of referencing text results.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 12-14B are workflows for accessing documents and templates and importing documents in conjunction with the present invention;

FIGS. 18 through 20 are a workflow and screen shots illustrating a user selected ISP search and results aspect of the present invention;

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention provides, among other things, software platform components that enable an application to perform several functions without leaving the document and the host application. Essentially, the document could become a software platform. These functions include for example extracting key context indicators such as document type (memo, pleading, agreement etc), jurisdiction and governing law (Orange County, N.Y. etc.) and storing them, for example, in a data structure logically associated with the user and/or the document. In some embodiments, a document identifier is also stored to uniquely associate the document with the user. Some embodiments store the data as metadata linked to the document; others within subscriber data for an online legal research service (or a professional information research service.) The system also presents relevant content options to users based on the context of the document being drafted. For example the system may include functionality that automatically extracts jurisdiction, document type and title from the document and allows searching similar content on WestLaw or WestLaw Business. The system may include the functionality of extract key legal entities from the document and using this information to enhance the document by adding relevant content. The system may automatically extract judge and party names, link automatically to profiles, extract and validate, KeyCite (KC) Flags (West BriefTools, West Knowledge Management (West KM)), and provide guidance on citation format (West CiteAdvisor). The system allows users to use predefined Litigation and Transactional workflows to track progress. This process is described in more detail below in the context of exemplary embodiments.

Exemplary Document Processing and Information Retrieval System

Figure 1:
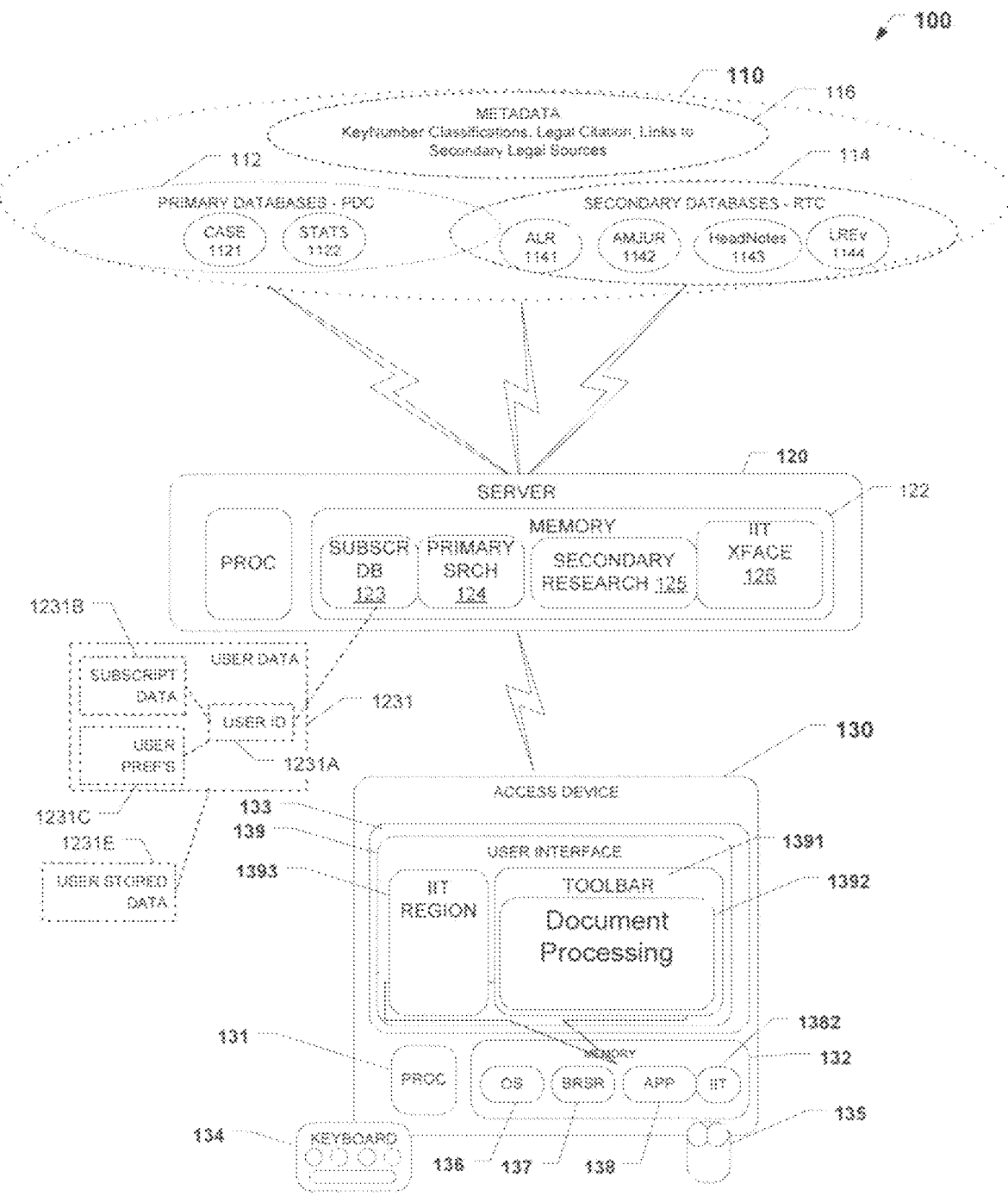
FIG. 1 is a first schematic diagram illustrating an exemplary computer-based system for implementing the present invention.

FIG. 1 shows an exemplary Integrated System 100 comprising an online information-retrieval (or legal research) system adapted to integrate with a client-operated document processing system. In this exemplary embodiment, System 100 includes at least one web server that can automatically control one or more aspects of an augmented document-processing application on a client access device. The document-processing application, for example, the Microsoft word application, is augmented with an add-on framework that integrates into the graphical user interface of the application and includes a browser control that can access one or more web-based applications and allow macro-type scripts of the web-based applications or services control the document processing application. System 100 includes one or more databases 110, one or more servers 120, and one or more access devices 130.

Databases 110 includes a set of primary databases (PDC) 112, a set of secondary databases (RTC) 114, and a set of metadata databases 116. Primary databases 112, in the exemplary embodiment, include a case law database 1121 and a statute database(s) 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, includes an ALR (American Law Reports) database, 1141, an AMJUR database 1142, a West Key Number (KNUM) Classification database 1143, and a law review (LREV) database 1144. Metadata databases 116 include, for instance, case law and statutory citation relationships, KeyCite data, depth of treatment data, quotation data, headnote assignment data, and ResultsPlus secondary source recommendation data. Other embodiments may include non-legal databases that include financial, scientific, or healthcare information. Still other embodiments provide public or private databases, such as those made available through WESTLAW, INFOTRAC, and more generally any open web or Internet content. Also, in some embodiments, primary and secondary connote the order of presentation of search results and not necessarily the authority or credibility of the search results.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, metadata research module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, secondary search module 125, and user-interface module 126.

Subscriber database 123 includes subscriber-related data for controlling, administering, and managing pay-as-you-go or subscription-based access of databases 110. In the exemplary embodiment, subscriber database 123 includes one or more user preference (or more generally user) data structures. In the exemplary embodiment, one or more aspects of the user data structure relate to user customization of various search and interface options. To this end, some embodiments include user profile information such jurisdiction of practice, area of practice, and position within a firm.

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Secondary module 125 includes one or more search engines for receiving and processing queries against one or more of databases 114. Some embodiments charge a separate or additional fee for searching and/or accessing documents from the secondary databases.

Information-integration-tools (IIT) framework module 126 (or software framework or platform) includes machine readable and/or executable instruction sets for wholly or partly defining software and related user interfaces having one or more portions thereof that integrate or cooperate with one or more document-processing applications. Exemplary document-processing (or document-authoring or -editing) applications include word processing applications, email applications, presentation applications, and spreadsheet applications. (More about the module 126 is described below.) In the exemplary embodiment, these applications would be hosted on one or more accesses devices, such as access device 130.

The invention may also include a metadata research module that includes one or more search engines for receiving and processing queries against metadata databases 116 and aggregating, scoring, and filtering, recommending, and presenting results. In the exemplary embodiment, the metadata module includes one or more feature vector builders and learning machines to implement the functionality described herein. Some embodiments charge a separate or additional fee for accessing documents from the second database. Also included may be a user-interface module that includes machine readable and/or executable instruction sets for wholly or partly defining web-based user interfaces over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, document processing software 138. (In the exemplary embodiment, memory 132 also includes document management software and time and billing system software not shown in the FIG. 1. In some embodiments, this software may be hosted on a separate server.) In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. In the exemplary embodiment, document processing software 138 includes one or more word processing applications, e.g., Microsoft Word processing software, Powerpoint presentation software, Excel spreadsheet software, and Outlook email software. Document processing software is shown integrated with information-integration tools 1381, which may be, for example, downloaded from server 120 via a wired or wireless communication link established with, for example, an ISP. Upon launching of the document processing software an integrated document-processing and information-retrieval graphical-user interface 139 is defined in memory 132 and rendered on display 133. Upon rendering, interface 139 presents data in association with one or more interactive control features (or user-interface elements). In the exemplary embodiment, each of these control features takes the form of a hyperlink or other browser-compatible command input. User selection of some control features results in retrieval and display of at least a portion of the corresponding document within a region of interface 139. Although FIG. 1 shows regions as being simultaneously displayed, some embodiments present them at separate times.

More particularly, interface 139 includes document-processing tool bar region 1391, document-processing (editing and display) region 1392, and integrated information region(s) 1393. In the exemplary embodiment, region 1393 includes control and display elements for external content and services, such as a listing of one, two, or more web apps (or locally supported apps) provided by server 120 and databases 110, specifically the web apps and framework components of module 126. Region 1393 includes control and display elements for metadata content related to completing a task related to authoring a document loaded into document-processing (active editing) window 1392. For example, region 1393 may list contact data regarding all persons, such as law-firm and client personnel, opposing legal counsel and court personnel, and witnesses associated with a legal case for which the loaded document is being prepared. Such entities and persons are referred to herein interchangeably as "entity", "person", "company", and "named entity". In some embodiments, region 1393 includes specific workflow information and control elements related to the user who launched the document-processing application and/or generic workflow information accessible via the user. In some embodiment, the user may select a workflow step or task within region 1393 and initiate update of the content or available tools and services of module 126.

Figure 2:
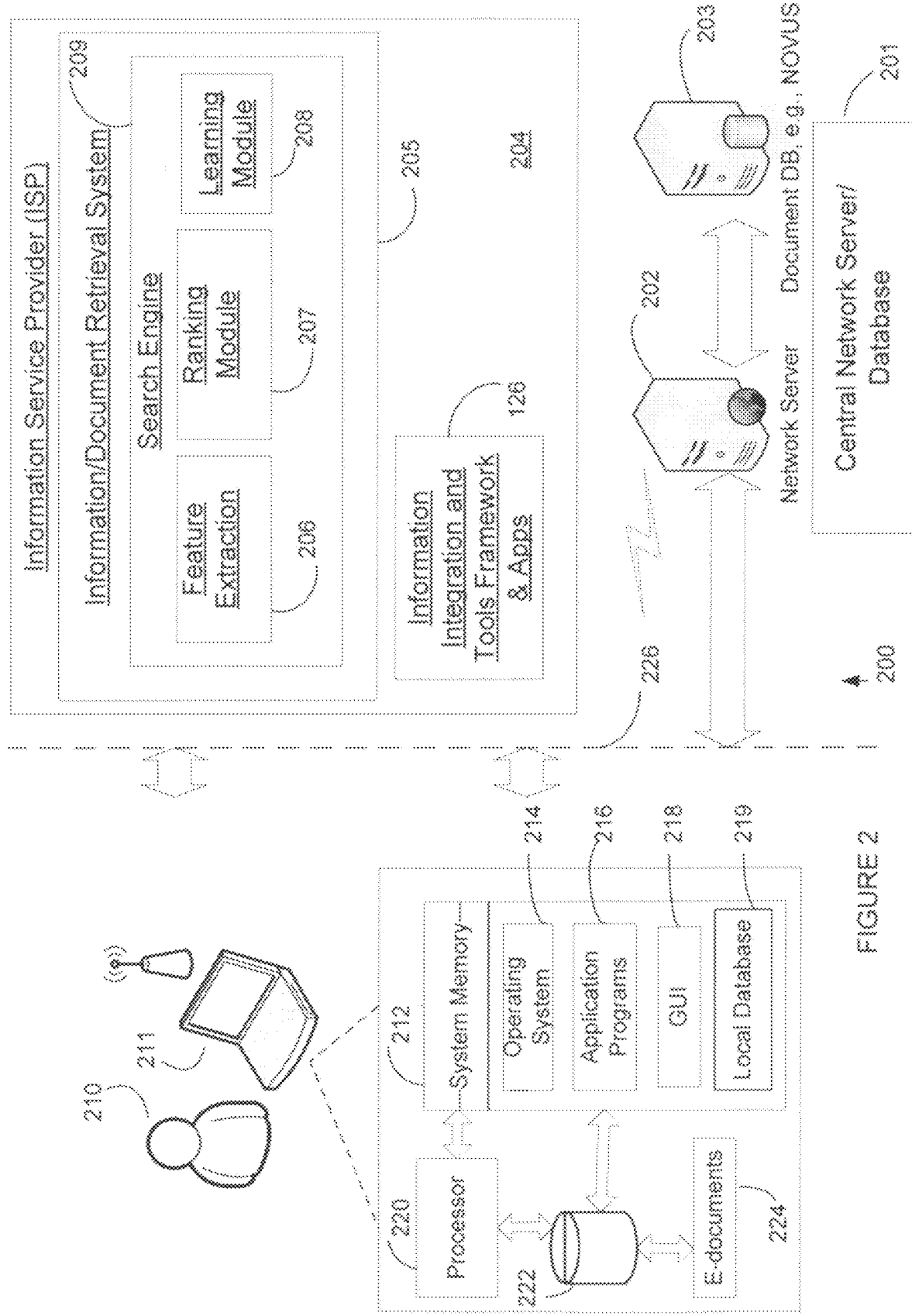
FIG. 2 is a second schematic diagram illustrating an exemplary computer-based system for implementing the present invention.

Also, in the exemplary embodiment, the information integration tools include local desktop tools, such as BriefTools, CiteLink, DealProof, LiveNote, local server tools and services, such as West km knowledge management system, ES, and Elite accounting, and remote tools and services, such as KeyCite and other Thomson Reuters or third-party tools and services. These tools are made available through an exemplary software platform or framework of module 126. As discussed in more detail below, one or more portions of tools, APIs and software are downloaded and installed as an add-on or add-in framework and set of associated APIs to host application 138. An Information Services Provider (ISP), such as Thomson Reuters West, provides a Litigation Support System (LSS) that is software-based, such as West Case Notebook, and that includes functionality operating at one or both of server 120 and client access device 130. FIG. 2, discussed below, shows another exemplary embodiment of the overall system.

In the exemplary embodiment the framework generally allows for building applications that operate in a user desktop workflow scenario. The exemplary framework or platform can be broken down into the following layers or silos. Hooks: Mechanism in the host application, such as a toolbar button in MS Word word processing application to invoke the container. Container: The area, such as a command bar object in MS Word application, where the feature applications are hosted. Applications: Feature applications that support a specific set of features. Service Blocks: Infrastructure pieces that feature applications can leverage.

A hook, in the exemplary embodiment, is designed as a mechanism for users to open the container from a host application. The hook loads itself inside that host application and then loads the container. A hook also introduces a uniform way to see the content. The hook, through the use of application programming interfaces (APIs), provides a way to get at, extract, and/or insert data of the particular opened document within the host application. A host application could be any Microsoft desktop application, WordPerfect, Adobe Professional, or a web browser (e.g., Internet Explorer, Netscape, FireFox, etc.). In one example, the host application is Microsoft Word. The exemplary embodiment provides single add-in for all supported Word versions. One way of achieving this support is to add an abstraction layer based on the use of reflection into the version specific library to allow the same code to work for all versions of Word. The abstraction layer is based on the most recent version, and falls back on earlier supported method calls if needed. It also fails gracefully when the functionality is missing in the Word version. Additionally, the layer implements changes to add-in to determine the correct version specific library to load and all method calls to Word object model using reflection.

For host application integration of the software platform, many interfaces provide support for including a hook that assists the host application to provide the user interface (UI) real-estate for the container as well as providing the integration mechanism itself. The UI real-estate is an area on the screen set aside for the container and a toolbar button. The host application is responsible for creating this space and creating an instance of Forms.DynamicContainer. Generally a window is created as the parent of the DynamicContainer. Additionally, the host is responsible for providing the ability to resize the area for the DynamicContainer.

The software platform is a managed .Net product with the Common Language Runtime (CLR) at the core and is loaded into the host process. CLR is a platform for software development that provides services by consuming metadata. In one embodiment, the software platform provides support and help for creating unmanaged host integrations using C++/COM. From a COM based language, the CLRLoader can be used to load the CLR into process, and invoke a designated managed class in a separate assembly to bridge into managed code and the rest of the add-in implementation. The CLRLoader is a COM object that can be created using standard COM methods (CoCreateInstance( )etc). It provides an interface that starts the CLR, and can load a managed class from an assembly with information provided in a configuration file. The managed class that is created by the CLRLoader must be given the HostShim Attribute and the user must define a method called "Configure" that returns a void and has a single "object" parameter. The software platform host application should implement the interface. Additionally, all the interfaces defined in the project, file document.cs are implemented on a set of classes to provide access to the document content of the host application.

In some exemplary embodiments, the container is designed to host feature application features and functions. However, some embodiments host the feature application itself. Hosted within the container is a browser control or mini embedded browser. The browser control does application user interface (UI) rendering and script execution. An exemplary browser control is Internet Explorer but any web browser or equivalent would be acceptable as well. UI rendering refers to displaying the user interface of the feature application within the container. The feature application UI's are developed using html and Cascading Style Sheets (CSS) but some embodiments use other browser based technologies, such as ASP.Net pages, Silverlight applications, Adobe Flash applications, etc. Much of the functionality of the feature applications is implemented in the JavaScript programming language. Embedded in the browser control is a JavaScript execution engine that reads the script and performs the requested operations defined in the JavaScript program.

Feature applications are designed with intent of reusing the software platform and functionality. They are developed independently but may be dependent on the software platform components. For example, one app inserts and updates flags. Assuming the software platform already has a communication service block and diagnostics service block (service blocks described in further detail below), the communication service block could be used to gather flag information and the diagnostics service block could be used to add tracing and logging into the application as well as add exception handling into the application.

Another example feature application provides linking to referenced documents. This feature application relies on Office Integration to provide a handle to the document in focus within Word. The application should also include the ability to select referenced documents for analysis. An assuming once again a diagnostics service block exists with the software platform, the diagnostics service block could be used to add tracing and logging into the application as well as add exception handling into the application.

There are a wide variety of ways to develop an application that can be hosted within the software platform container. At a minimum in the exemplary embodiment, the user needs to provide an XML feature file that informs the software platform where the HTML page for the UI resides and the HTML UI itself. The Features XML file is a simple XML document that contains the URL for the main UI for a given feature/application. It consists of a root element"", a single child element"" whose content is the URL of the HTML User Interface of the application. This features XML file is deployed to the user's desktop. The UI can take the form of a static HTML page or other web application language. The inclusion of a script tag for the inject.cs script file facilitates access to the desktop injected items of the Host and ServiceLocator. The ServiceLocator is used to create instances of other Desktop Services by name. The UI location is constrained by the container, and thus influences design of the UI.

If the application needs to access content from within the software platform host application, the exemplary embodiment references the two JavaScript files (inject.cs and Load.cs) that are a part of the software platform main web package. JavaScript interacts with the desktop services provided. This gives access to a JavaScript reference to the "host" object as well as the "locator" ServiceLocator object. Finally, if the application provides a desktop service, the service implementation (See Software Platform Exemplary Service Practices section) is provided in an installable package.

Feature applications call service blocks which are designed with the intent of reusability and expose the services of those feature applications. In other words, the purpose of service blocks is to supply local reusable components to a feature application. The functionality can be accessed via JavaScript and/or by referencing the necessary .net assemblies. Examples of application building platform components that can be leveraged are more fully detailed and set forth in U.S. Published Application Publ. No. 2010/0115401, the entirety of which is incorporated herein by reference.

In one embodiment of operating a system using the present invention, an add-on framework is installed and one or more tools or APIs on server 120 are loaded onto one or more client devices 130. In the exemplary embodiment, this entails a user directing a browser in a client access device, such as access device 130, to internet-protocol (IP) address for an online information-retrieval system, such as the Westlaw system and then logging onto the system using a username and/or password. Successful login results in a web-based interface being output from server 120, stored in memory 132, and displayed by client access device 130. The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client device. In one alternative, an intermediary "firm" network server may receive one or more of the framework, tools, APIs, and add-on software for loading onto one or more client devices 130 using internal processes.

Once installed in whatever fashion, a user may then be presented an online tools interface in context with a document-processing application. In the exemplary embodiment, this entails a user launching and opening or creating a document using one or more of the following independent applications: Microsoft Word word processing application, Corel WordPerfect word processing application, Internet Explorer browser application, Adobe Acrobat desktop publishing application, and Microsoft Outlook email application. As used herein "word processor" and "word processing application" refers broadly to "document processors" and "document processing applications" and the use of "word" and "document" should be given broad meaning in the context of units of communication and include such forms as electronic mail and other discrete forms of electronic communications or containers of information. Add-on software for one or more of these applications is simultaneous invoked, which in turn results in presentation of the add-on menu. The add-on menu includes a listing of web services or application and/or locally hosted tools or services. A user selects via the tools interface, such as manually via a pointing device. Once selected the selected tool, or more precisely its associated instructions, is executed. In the exemplary embodiment, this entails communicating with corresponding instructions or web application on server 120, which in turn may provide dynamic scripting and control of the host word processing application using one or more APIs stored on the host application as part of the add-on framework.

For example, the user launches the host application (i.e. Microsoft Word, WordPerfect, etc.) to work on a document, e.g., legal brief or memorandum. A Word processor Software Framework (WSF) interface includes code, add-on or module that may be loaded as an add-on to the host application, e.g., App 138. This will load the WSF Document API, the WSF Application Container, initialize the installed Application List, and create the UI elements (Ribbons, toolbars, menu items, etc.). The user opens a document and selects the desired WSF Application from a list of applications presented via the integrated UI elements. WSF displays the application within the WSF Container and navigates the embedded browser to the applications base URL (server 120, appropriate portion of IIT module 126). WSF applications can be installed and run as: Local HTA (i.e., locally installed HTML, JS, CSS, etc.); Enterprise web application (intranet or extranet); or Internet web application, for example. WSF injects the WSF Document API references into the JavaScript execution engine for access from the applications JavaScript. The document in display (active edit window of host application, such as a word processing application) preserves the context of the application in WSF (i.e., each document has its own instance of WSF which can be customized based on user preferences).

The WSF JavaScript execution engine allows the application code to run. The application can use the WSF API's to access the contents of the opened host (i.e., Microsoft Word, WordPerfect, etc.) Document, including modifications to these documents. The WSF API's exposed to the client include but are not limited to: collection of Open Documents, including API methods for accessing Document specific data; collections of Paragraphs, Footnotes, Endnotes, Tables of Authority, hyperlinks, images and many other document content objects within a specific open document; and the ability to create a Location object to represent a given textual location within the document.

The WSF API methods that are called by the application in turn will call methods exposed by the Host application (ex. Microsoft Word). The manner in which these calls are done is Host application specific and dependent on facilities exposed by the Host application. The WSF manages the mappings between its own API and the functionality exposed by the Host. Additionally, the application can use native browser capabilities and other WSF functionality to communicate with web services available locally on the host machine, at enterprise (intranet or extranet), or the over the Internet.

FIG. 2 illustrates another representation of an exemplary system 200 for carrying out the herein described processes that are carried out in conjunction with the combination of hardware and software and communications networking. In this example, system 200 provides a framework for searching, retrieving, analyzing, and ranking claims and/or patent documents as well as a system for monitoring user subscription rights and access and for downloading tools and software associated with providing enhanced services to subscribed users. System 200 may be used in conjunction with a system 204 offering of an information or professional services provider (ISP), e.g., West Services Inc., a part of Thomson Reuters Corporation, and include an Information Integration and Tools Framework and Applications module 126, as described hereinabove. Further, in this example, system 200 includes a Central Network Server/Database Facility 201 comprising a Network Server 202, a Database of documents, e.g., published court decisions, statutes, etc., 203, an Information/Document Retrieval System 205 having as components a Search Engine 209, a Feature Extraction module 206, a Ranking module 207 and a Learning Module 208. The Central Facility 201 may be accessed by remote users 210, such as via a network 226, e.g., Internet. Aspects of the system 200 may be enabled using any combination of Internet or (World Wide) WEB-based, desktop-based, or application WEB-enabled components. The remote user system 210 in this example includes a GUI interface operated via a computer 211, such as a PC computer or the like, that may comprise a typical combination of hardware and software including, as shown in respect to computer 211, system memory 212, operating system 214, application programs 216, graphical user interface (GUI) 218, processor 220, and storage 222 which may contain electronic information 224 such as electronic documents. The methods and systems of the present invention, described in detail hereafter, may be employed in providing remote users access to a searchable database. In particular, remote users may search a document database using search queries based on patent claims to retrieve and view patent documents of interest. Because the volume of documents is quite high, the invention provides scoring and ranking processes that facilitate an efficient and highly effective, and much improved, searching and retrieving operation. Client side application software may be stored on machine-readable medium and comprising instructions executed, for example, by the processor 220 of computer 211, and presentation of web-based interface screens facilitate the interaction between user system 210 and central system 211. The operating system 214 should be suitable for use with the system 201 and browser functionality described herein, for example, Microsoft Windows Vista (business, enterprise and ultimate editions), Windows 7, or Windows XP Professional with appropriate service packs. The system may require the remote user or client machines to be compatible with minimum threshold levels of processing capabilities, e.g., Intel Pentium III, speed, e.g., 500 MHz, minimal memory levels and other parameters.

The configurations thus described are ones of many and are not limiting as to the invention. Central system 201 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 201 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 8I™, 10G™, or some other suitable database application may be used to manage the data. These tables may be organized into an RDS or Object Relational Data Schema (ORDS), as is known in the art.

Figure 5:
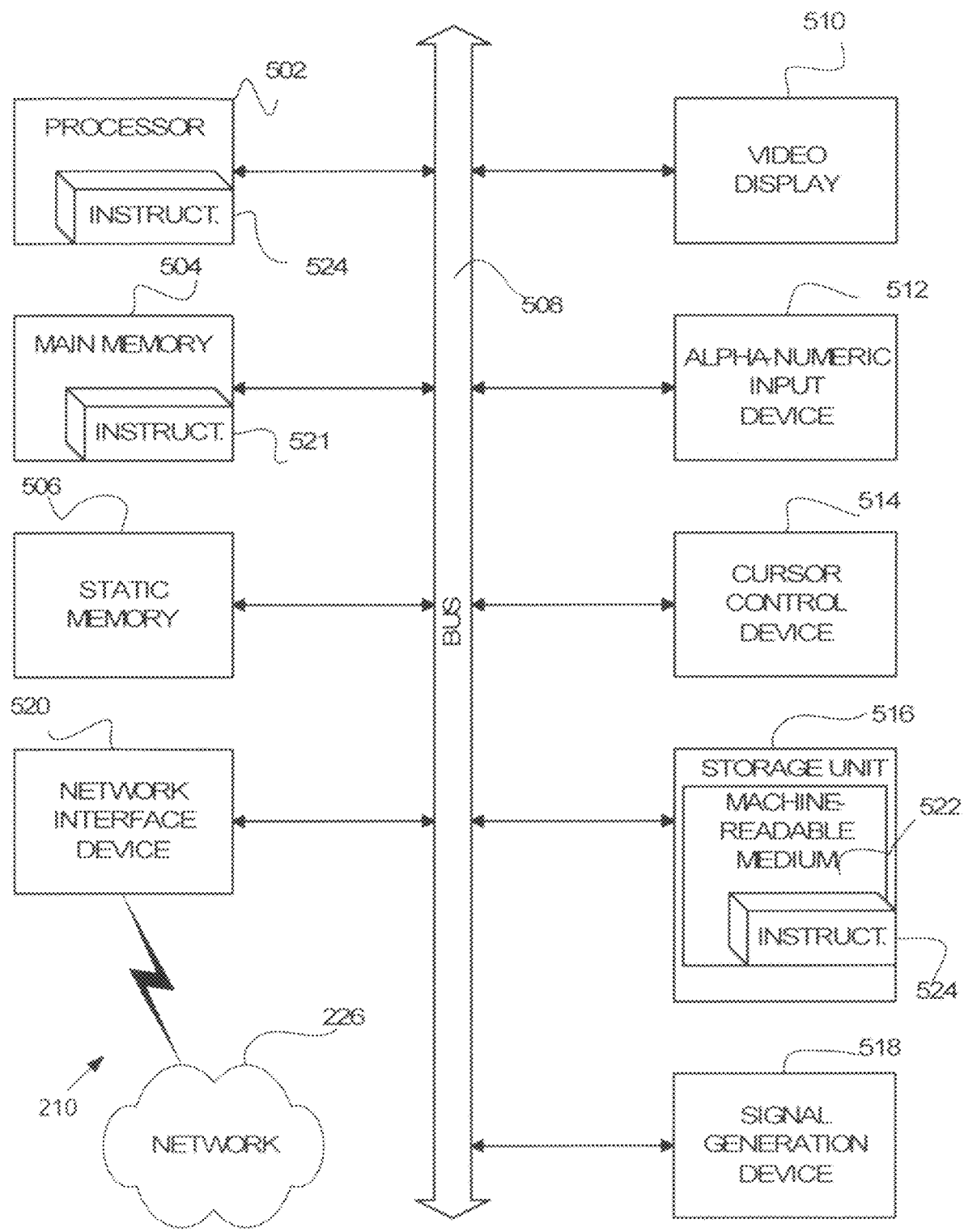
FIG. 5 is a schematic diagram of a hardware configuration of a processor-based system for implementing the present invention.
Figure 6:
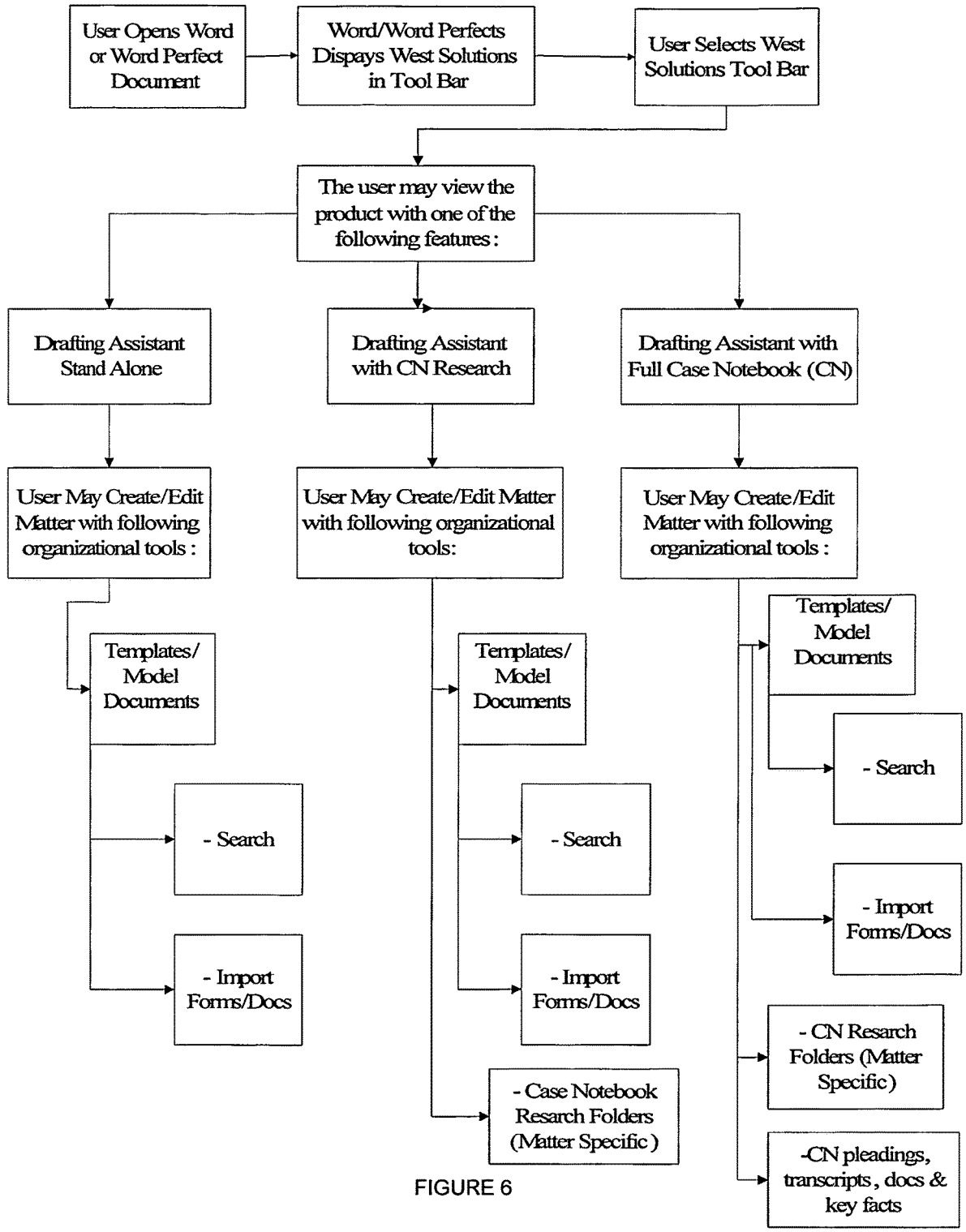
FIG. 6 is a workflow associated with processing the Drafting Assistant aspect of the present invention.

Now with reference to FIG. 5, an exemplary representation of a machine in the example form of a computer system 500 within which a set of instructions may be executed to cause the machine to perform any one or more of the methodologies discussed herein. In particular, the system 500, and variations of this, may be used to implement the /system/modules/interfaces. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may comprise a server computer, a client computer, a personal computer (PC), a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504 and a static memory 506, which communicate with each other via a bus 508. The computer system 500 may further include a video display unit 510, a keyboard or other input device 512, a cursor control device 514 (e.g., a mouse), a storage unit 516 (e.g., hard-disk drive), a signal generation device 518, and a network interface device 520.

The storage unit 516 includes a machine-readable medium 522 on which is stored one or more sets of instructions (e.g., software 524) embodying any one or more of the methodologies or functions illustrated herein. The software 524 may also reside, completely or at least partially, within the main memory 504 and/or within the processor 502 during execution thereof by the computer system 500, the main memory 504 and the processor 502 also constituting machine-readable media. The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Exemplary Methods of Operating

The invention may be used in connection with searching based on known terms but is particularly powerful when a user uses terms not traditionally used in connection with an issue or a subject, e.g., "everyone agrees to the underlying events" as opposed to "no genuine issue of Material fact" in the context of summary judgment proceedings. The invention provides the enhanced feature of searching not only primary sources (FIG. 1—Primary DBs 112), e.g., case law and statute databases, but also searching secondary sources of collections or sets of referencing texts (FIG. 1—Secondary DBs 114). The resulting set of referencing text documents yielded by the second layer of searching is then used to identify and present primary source case law relevant to an issue being researched. In this manner the invention provides an added layer of searching within a wholly separate and distinct body of reference documents or texts and then uses that secondary source search to further search primary source databases to thereby enriching and enhancing the set of primary source documents ultimately provided to the user. When used in conjunction with ranking, scoring and other helpful techniques, the invention enhances the effectiveness of the overall system performance.

"Referencing text documents" included in Reference Text Collections or Sets (RTC or RTS), e.g., ALR, are documents that are not part of the body of law or direct legal authority but that do cite to case law, statutes, regulations and other legal authorities. The invention processes the search criteria to yield a responsive set of referencing text documents from the RTC based on a user search request or query, such as may be highlighted or otherwise derived from a working document operating in a word processor application by the user. The responsive set of referencing text documents are identified by matching search terms or criteria with text appearing in the referencing text documents that is associated with case law cited in the referencing text documents.

The system identifies those citations related to the highlighted or search terms found in the referencing text documents to yield a set of "referencing text results", which is a set of case law cited in the referencing text documents. Accordingly, the invention generates a set of search results comprised of two sets of case law for presenting to a user on a subject of interest. The first set of case law is generated by performing the search on the primary case law database and the second set of case law is generated based on the citations contained in the set of referencing text documents that relates to the user search request. In this manner, the invention provides a seamless integration of searching functions and database resources from the word processor environment that includes not only primary case law but also secondary sources of non-case law. Accordingly, when searching from the word processing environment for terms or highlighted statement contained within a working document, the invention provides an additional layer of searching in addition to traditional ISP systems and provides an enhanced way of searching for responsive legal authority based on terms not traditionally used and that appear in secondary sources, e.g., ALR. The system provides searching in both the primary and the secondary sources and presents responsive case law from the primary source and case law that is cited in responsive referencing text documents. In addition, the system may rank, together or separately, the two sets of case law, the primary search results from the primary database of case law and the set of referencing text results. The system may also reduce, such as through a de-duplication process, the set of search results or the component search results. The system may display to the user the respective responsive search results either combined or separated. The set or search results are then available for user examination and may be incorporated into the working document.

Figure 3:
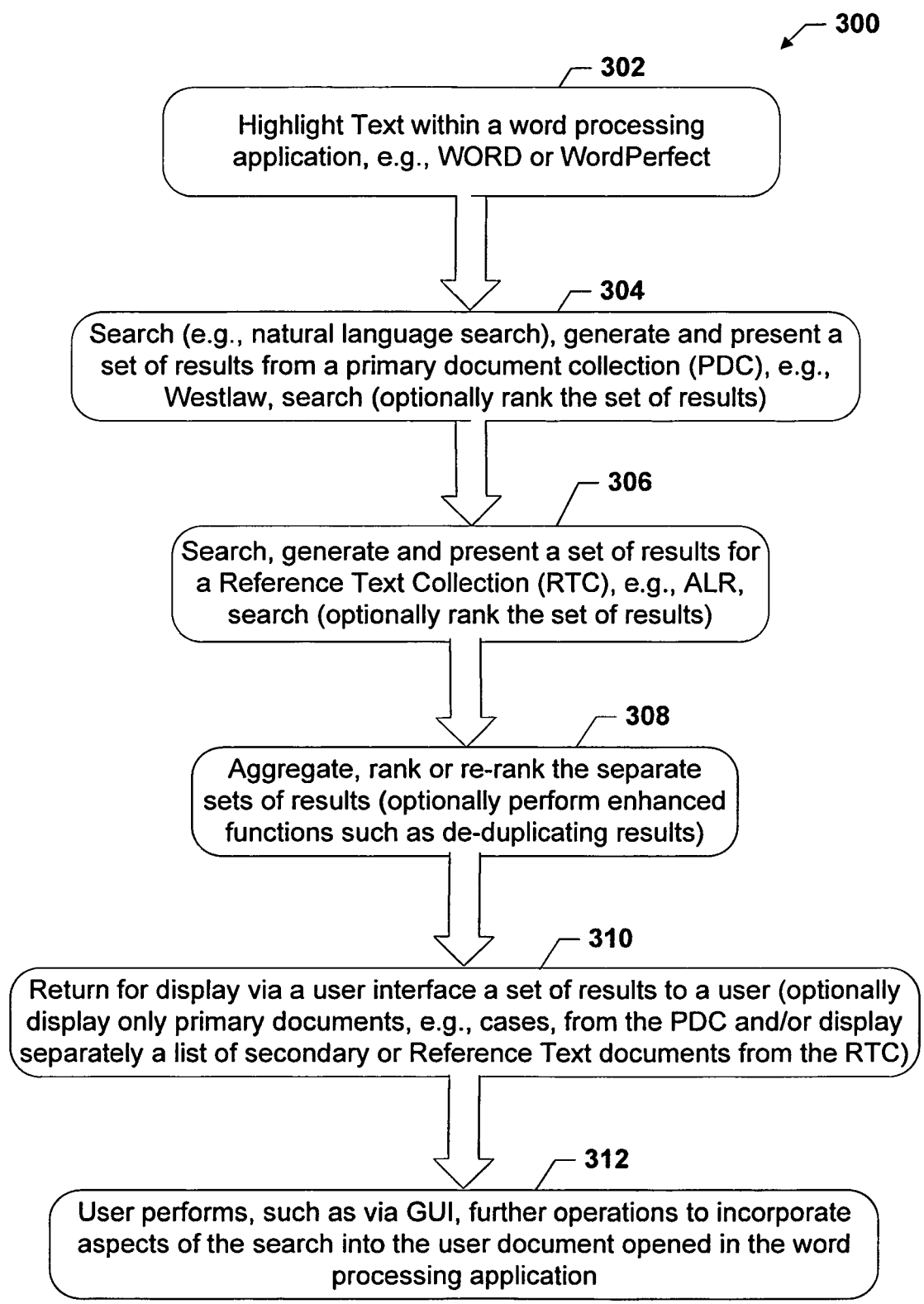
FIG. 3 is a search flow diagram illustrating an exemplary method of implementing the present invention.

In one exemplary method of operation, and with reference to the flow of FIG. 3, the following processes are performed. Initially, at step 302, a user highlights text within a word processing application. At step 304 the system uses the highlighted text as a query, or to derive a query, to search a primary document collection/database, e.g., Primary DB 112 of FIG. 1. At step 306, the system uses this same information to search a reference text collection/database, e.g., RTC 114 of FIG. 1. Optionally, text may be normalized before it is used a search query. In particular, the Novus search API may do some standard normalization before executing the search. The query may be identical for each search and can be run simultaneously. At step 308, the system aggregates, ranks, and/or re-ranks the search results, either separately or in the aggregate. In addition, the system may invoke enhanced functions of IPS services such as de-duplicating process to further refine the search results. The queries may both be "natural language searches" using the same Novus search APIs. The searches may be metadata restricted, for example, to specify jurisdiction. The processes of steps 304-308 may be performed in part outside the user experience, including: receiving a ranked set of results for the document collection search; receiving a ranked set of results for the reference text collection search; re-ranking the aggregated results. At step 310, the system returns for display via a user interface a set of results to a user (optionally displays only primary documents, e.g., cases, from the PDC 112 and/or display separately a list of secondary or Reference Text documents from the RTC 114). At step 312, the user performs, such as via GUI, further operations to incorporate aspects of the search into the user document opened in the word processing application, e.g., 139/1392 of FIG. 1.

In one manner, re-ranking involves taking aggregated results and applying a statistical model to re-rank the results. The re-ranking algorithm receives search result lists from both searches. The lists are filtered by jurisdiction and other criteria. Also, for instance, "writ denied" cases from the referencing text collection may be filtered out before being sent to the re-ranking algorithm. Note that the aggregated set of results could have duplicate cases with different rankings; usually take the higher ranked case. For example, Case A could have been found in Primary Document Collection, e.g., 112, and is ranked #1; Case A could also be found in Reference Text Collection, e.g., 114, and is ranked #2. In this scenario Case A from the PDC collection would be used and the Case A from Reference Text Collection will be discarded before the statistical model is run. Return a list to the UI (User Interface, e.g., 139/1393) of some or all search result Document GUIDs along with which source that Doc GUID came from (i.e., PDC Collection or RTC—Reference Text Collection). In ranking responsive documents, the source, e.g., primary or secondary, may be used to differentiate the results presented to the user. For instance, in one pane the results from the ISP or primary source may be listed, ranked or not, and in a second pane the results from the secondary source, e.g., referencing texts from sources such as ALR, AmJur, etc., may be presented. A variety of search functions may be performed on either or both sets, separately or collectively, in determining a set or sub-set of documents from the primary and secondary sources to present to the user.

With respect to the document collections, the collections may be arrived at by Natural Language search on cases. Could be an all cases search with filter available at any time afterward but before it gets to the user. Alternatively it could be a specific case search of only certain jurisdictions, court levels. For instance, about 100 cases may be passed through to be re-ranked. The number of cases returned for ranking or presenting may be limited.

Figure 4:
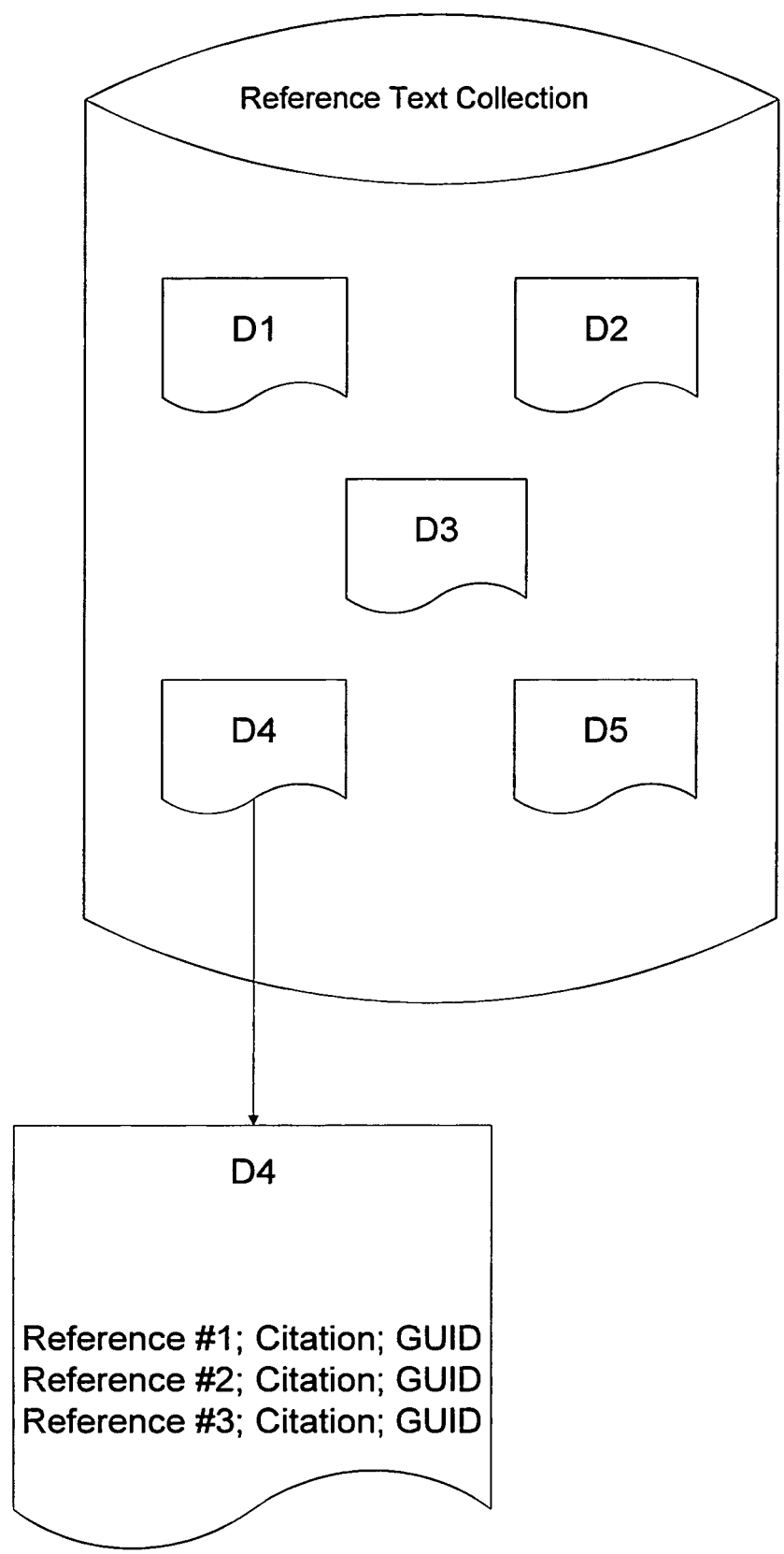
FIG. 4 is a flow diagram illustrating a database and document accessing aspect of the present invention.

With respect to the Reference Text Collection (RTC) associated with secondary sources or databases, and the exemplary structure of FIG. 4, the system may be structured so that the Reference Text Collection contains "Pseudo Documents" and operates as follows. Each Case has a Pseudo Document within the RTC collection. Pseudo Documents contain references, citations and GUID for the case, e.g., a litigation maintained in a Litigation Support System (LSS), such as West Case Notebook. Reference: pre-determined amount of text that supports the proposition that the case is being cited for. With respect to initially populating the RTC collection with Pseudo Documents, search for citations within the briefs and case databases. Once a citation is found, collect pre-determined amount of text immediately preceding the citation (every citation is one reference). The system associates the reference and related citation to a Case ID/Doc GUID. The system concatenates new references onto existing GUID if there is one or it creates a pseudo document if the GUID has not been seen before. Concatenating occurs on to an existing Pseudo Document. The system stores Pseudo Documents within the RTC collection if, for example, they have a pre-defined number or more references, e.g., 10. If they do not have the requisite number of references then the system stores the Pseudo Documents in a separate collection. If the references in the separate collection become greater than, for example, 10 for a pseudo document then the pseudo document is moved to the RTC collection. Also, the system may be configured to truncate Pseudo Documents at a set number or threshold, e.g., 500 references. Limiting the number may be especially necessary where Pseudo Documents for very highly cited cases contain so many words that nearly any search terms would return those documents. The language may be too broad. In one manner, as new cites are added to Pseudo Documents, only the most recent 500 cites (or citations) may be included. In other words, when the $501^{st}$ cite is added, the $1^{st}$ (earliest) cite will roll off and the Pseudo Document will be back at 500 cites. In addition, metadata about the case (jurisdiction, court level) may be accessed to help in the re-ranking of aggregated search results but can also be helpful if the UI decides to filter by the metadata right before displaying the results to the user. In the diagram of FIG. 4, D4 implies three bits of information in the Pseudo Document. However, the Pseudo Document may be a structured document with, for example, the following fields:
1. Case GUID
2. Metadata
  a. Case jurisdiction
  b. Case court level
3. Citing document A and its referencing text
4. Citing document B and its referencing text
5. Citing document C and its referencing text . . .
n. Citing document X and its referencing text All referencing text for the case is effectively concatenated together as a single paragraph as far as the natural language search is concerned. To allow the UI to be able to display the referencing text for a given reference (the best matching reference, usually), the system may be configured to add "padding" in between each chunk of referencing text (fields 3, 4, 5, and n) above. This is because the search engine, e.g., West's Novus platform, may be configured to return the text surrounding only the best matching portion of the Pseudo Document.

For example, say the user's query happens to return the Pseudo Document above. The search engine, e.g., Novus, may also identify which is the best matching portion within the document, and may flag the text surrounding the best matching portion. For instance, if the referencing text for citing document B matches the user's query the best. Because of the padding, the best matching text returned will only be for citing document B. The referencing text around documents A and C are just too "far" away from the best matching portion due to the padding. This approach may be used to facilitate the UI usage of the documents returned from referencing text search. The padding has no effect on the search itself, as the search doesn't recognize the padding—it's only used to determine which text to return as the best matching portion with no pollution from adjacent referencing text.

FIGS. 6 and 7A-7C illustrates methods of installation and updating of software platform in association with the present invention. Generally, one way for the user to deploy a software platform is to access a download site containing a base package for an application that includes a software platform built on a .NET framework and COM technology, a feature application, and, optionally, an updater. The user downloads this package and deploys the software platform along with the feature application and possibly the updater. Another option is to download and deploy the individual components separately in install order of the .NET framework, software platform, a feature application. The updater can be installed anytime after the software platform is installed. In the exemplary embodiment, the updater and the software platform are independent of each other.

Generally, there are five exemplary methods for how to update the software distribution: direct from the provider's software platform server (on-site distribution server)—Updater directly; from remote provider's server (remote distribution server located within user's firewall)—Updater directly; user manually kicks off update process direct from provider server (on-site distribution server), user snapshots the changes to create his/her own installation package; manually get a copy of the software to install on a test workstation. Once o.k. on the test or base image, it is pushed out via SMS or another distribution package; and user wants the list of changed and files for the update and creates his/her SMS package from the documentation.

Figure 7A:
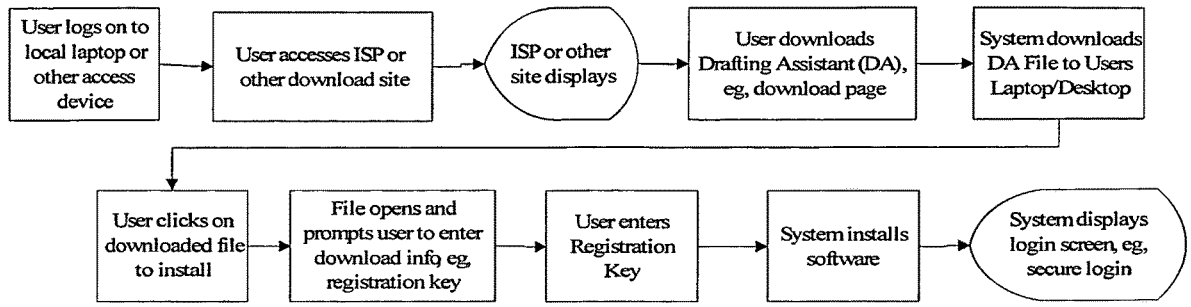
FIGS. 7A-7C represent a logon and access aspect in conjunction with the present invention.
Figure 7B:
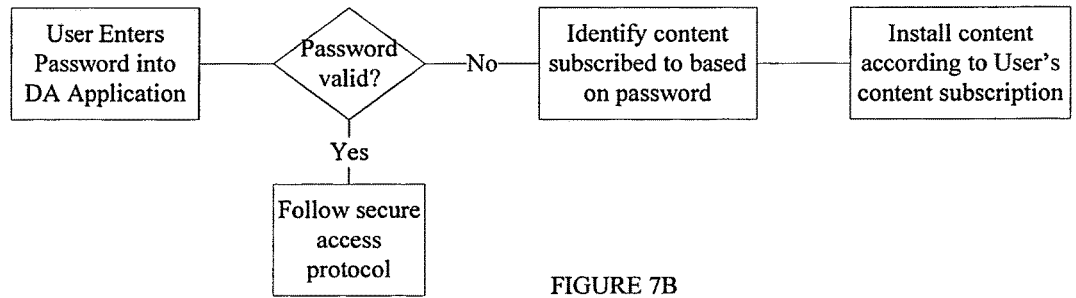
Figure 7C:
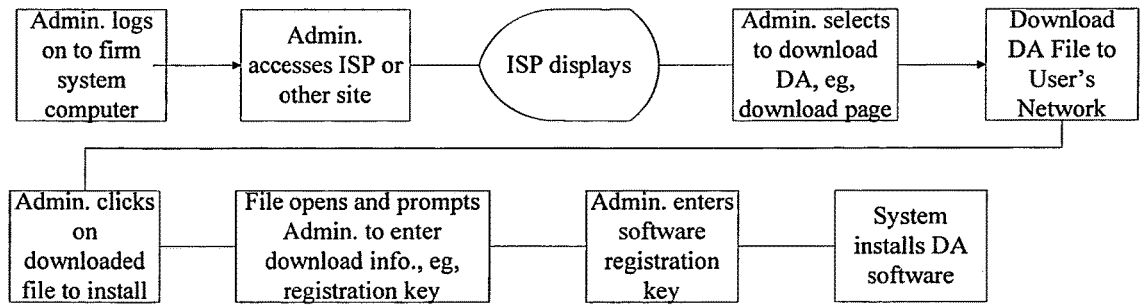
Figure 7D:
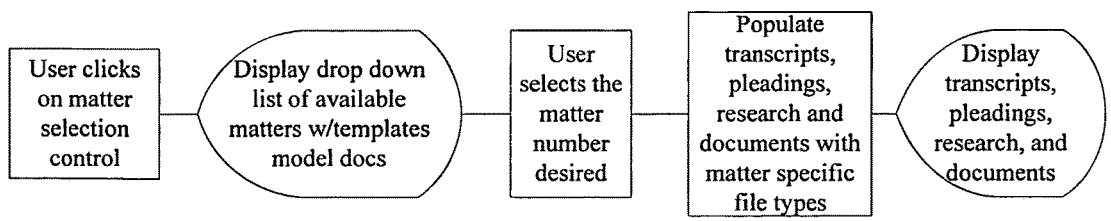
FIG. 7D represents a matter control aspect in conjunction with the present invention.
Figure 8:
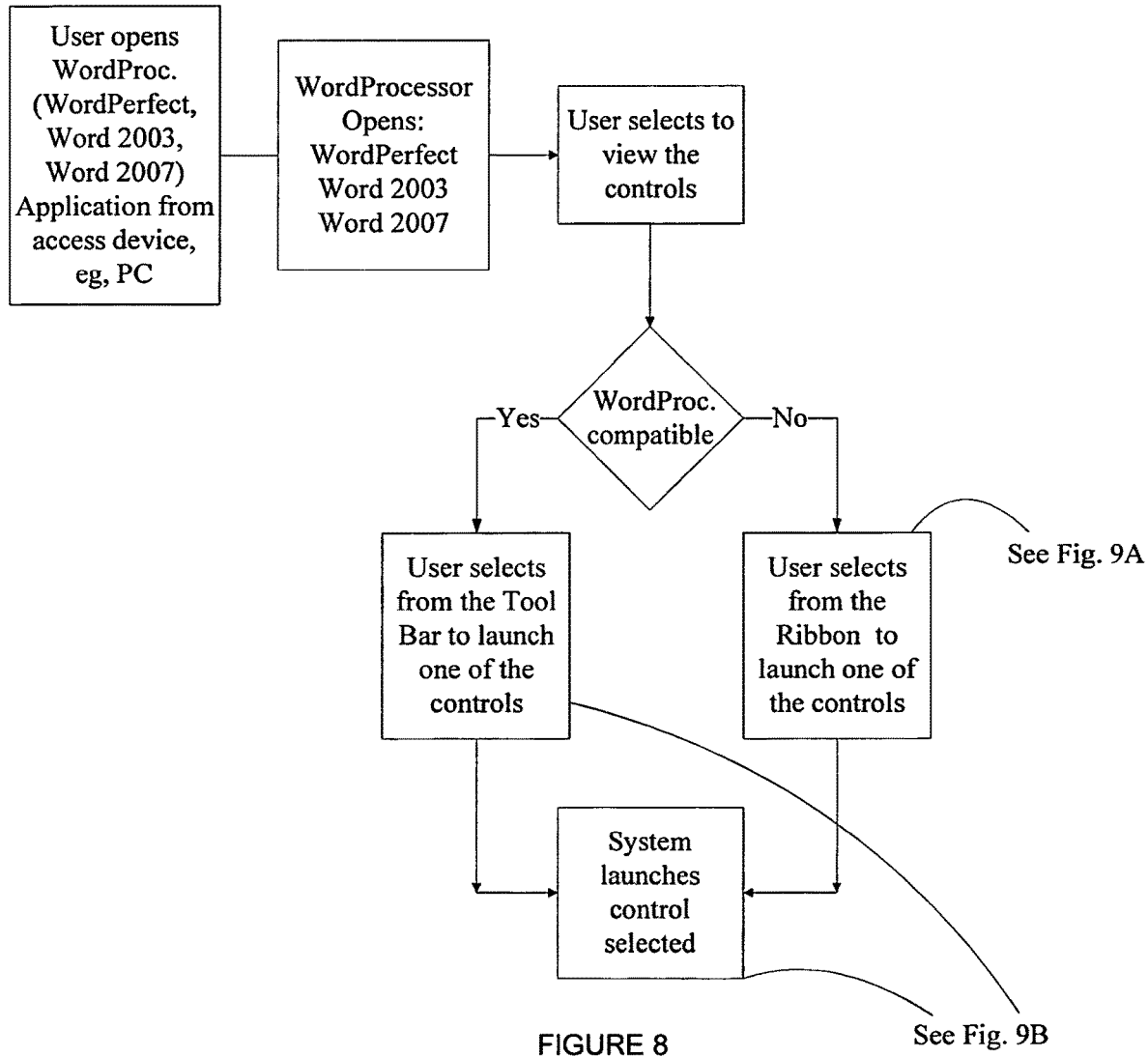
FIG. 8 is a workflow for determining compatibility of applications and controls in conjunction with the present invention.
Figure 10:
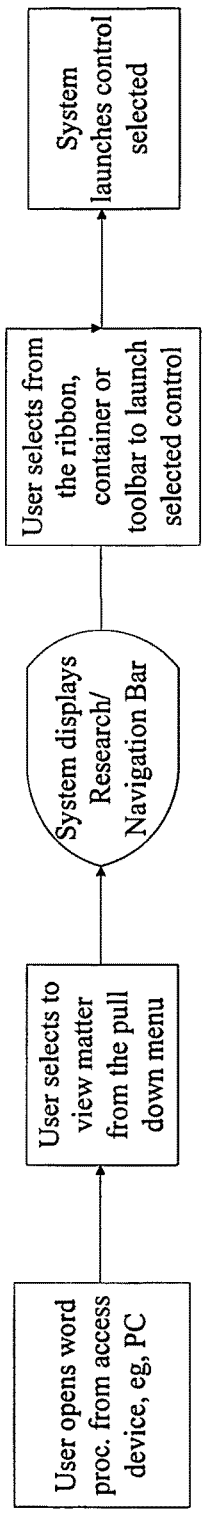
FIG. 10 is a workflow for selecting controls in conjunction with the present invention.

FIGS. 7D and 10 illustrate an exemplary manner of handling matter control in the context of the exemplary implementation of the invention. In the examples discussed below, the "matter" refers to a particular litigation or other legal proceeding for which a file or working area is set up on an LSS, for instance on Case Notebook. In this example, the LSS may include a set of existing template or genericized document types to assist the user in preparing documents of the sort commonly associated with a broad range of litigated issues. For example, the documents may include genericized, or previously prepared, Pleadings, Motions, and Memoranda (PM&M). In particular, the documents may include the following Motions: Alter Judgment; Certify Class; Compel; Compel Arbitration; Compel Discovery; Consolidate; Declare a Mistrial; Directed Verdict; Dismiss; Dismiss for Lack of Jurisdiction; Limine; Intervene; Joinder; Judgment Notwithstanding the Verdict; Judgment as a Matter of Law; Judgment on Partial Findings; Judgment on the Pleadings; Judgment Under Rule 54(b); New Trial; Partial Summary Judgment; Permanent Injunction; Preliminary Injunction; Protective Order; Remand; Set Aside Judgment; Set Aside Verdict; Stay Discovery; Strike; Summary Judgment; Temporary Restraining Order; and Vacate. The set of genericized documents may also include the following documents: Trial Brief; Pleadings; Complaints; Answers and Counterclaims; and Briefs. The User shall have the ability to access Templates/Model documents and to access matter-specific Transcripts, Documents, Pleadings and Research. Also, the User can generate the following reports: annotations; issues; full text search; key facts; and case.

Figure 9A:
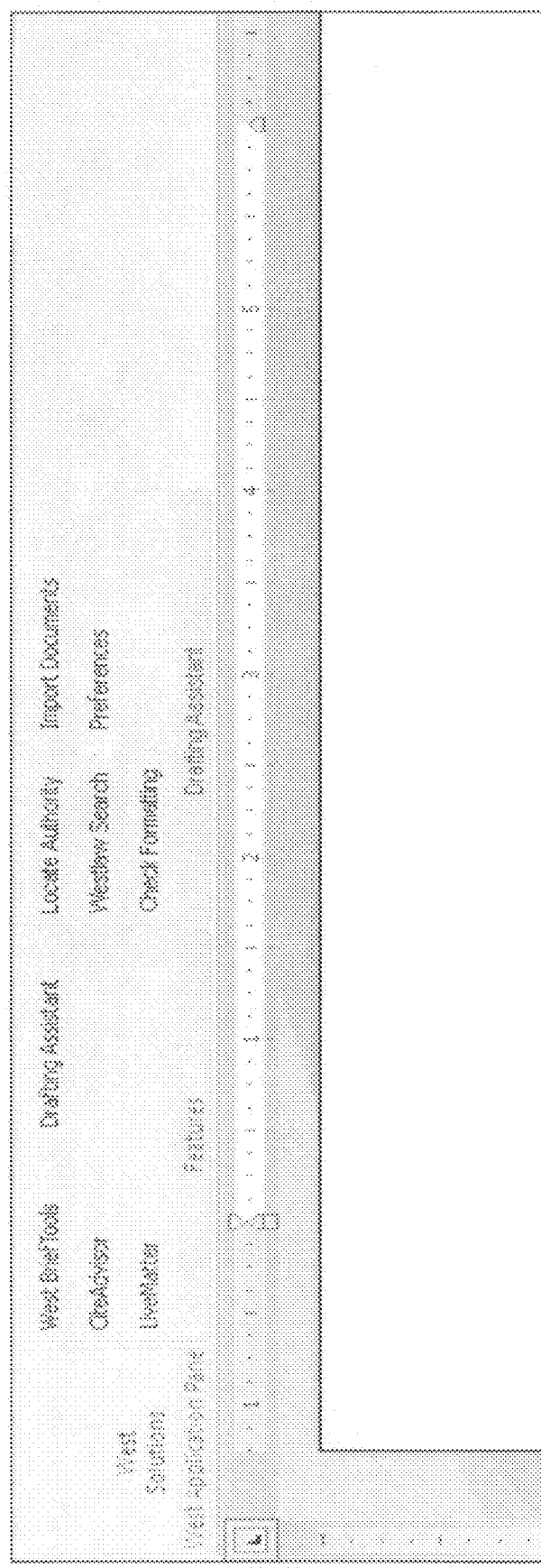
FIGS. 9A-9B are screen shots representing IIT controls aspect in conjunction with the present invention.
Figure 9B:
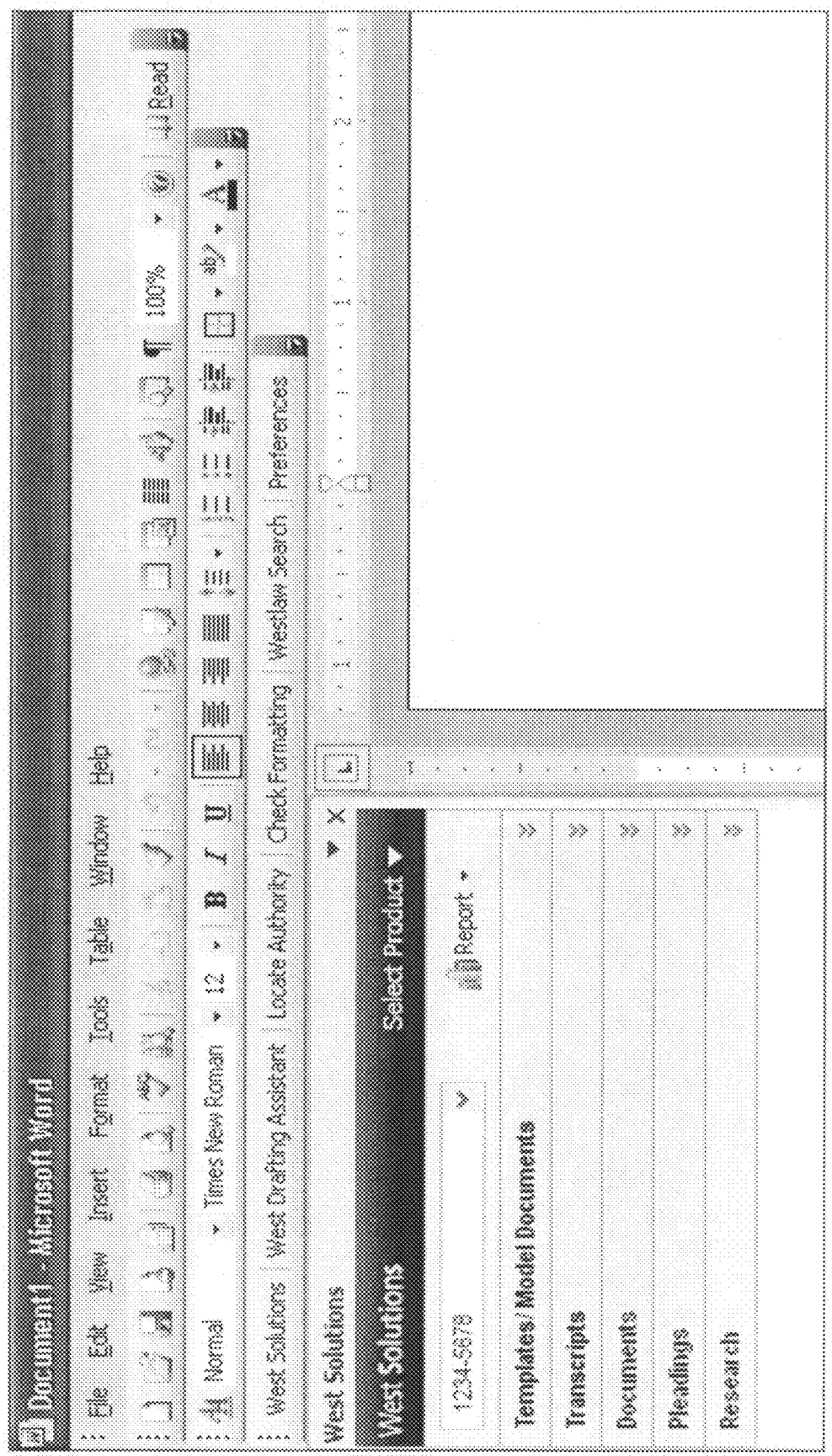

The portion of the LSS that facilitates integration of the word processing host application and a research and litigation support features may be called a "Drafting Assistant." The workflow of FIG. 9 and corresponding screen shots of FIGS. 9A and 9B, illustrates a manner in which a user opens a word processing application. The IIT aspect of the invention, as described above, has been loaded and resides at the client access device, e.g., computer, 130 and presents to the user via a GUI control options, which may be presented in any of a number of acceptable ways including via toolbar, ribbon, container, dialog boxes, etc. FIG. 9A illustrates a GUI presenting control options via a ribbon. FIG. 9B illustrates control options appearing in a container. The user selects from the user interface a control and the system launches the control selected. Exemplary controls include: locate authority; check formatting; ISP/Westlaw search; Import documents; and Preferences, for example. If the User selects Locate Authority, the system launches the Locate Authority feature. If the User selects Check Formatting, the system launches the Rules Based Validation engine. If the User selects Westlaw Search, the system launches the Westlaw Search process. If the User selects Import Document, the system launches the process to add documents to Templates/Model Documents.

Figure 12:
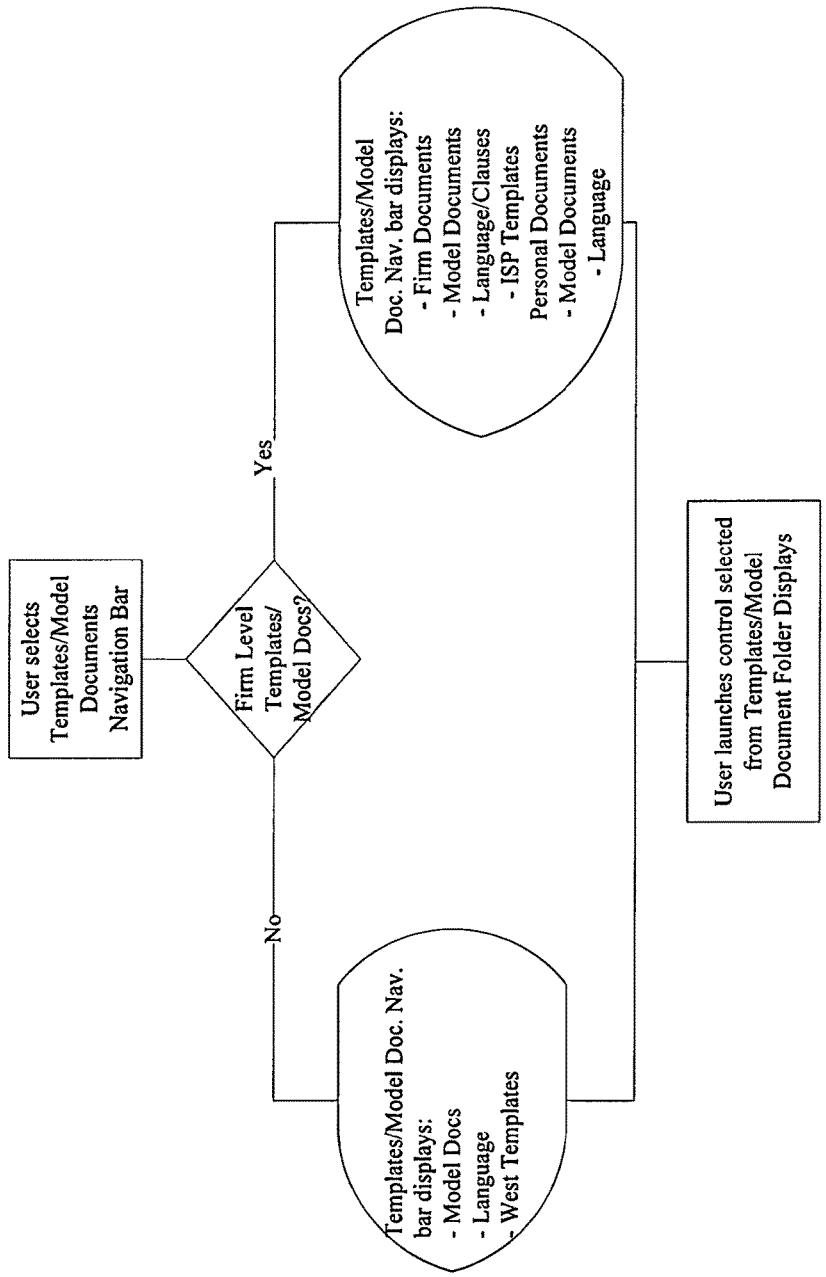
Figure 11:
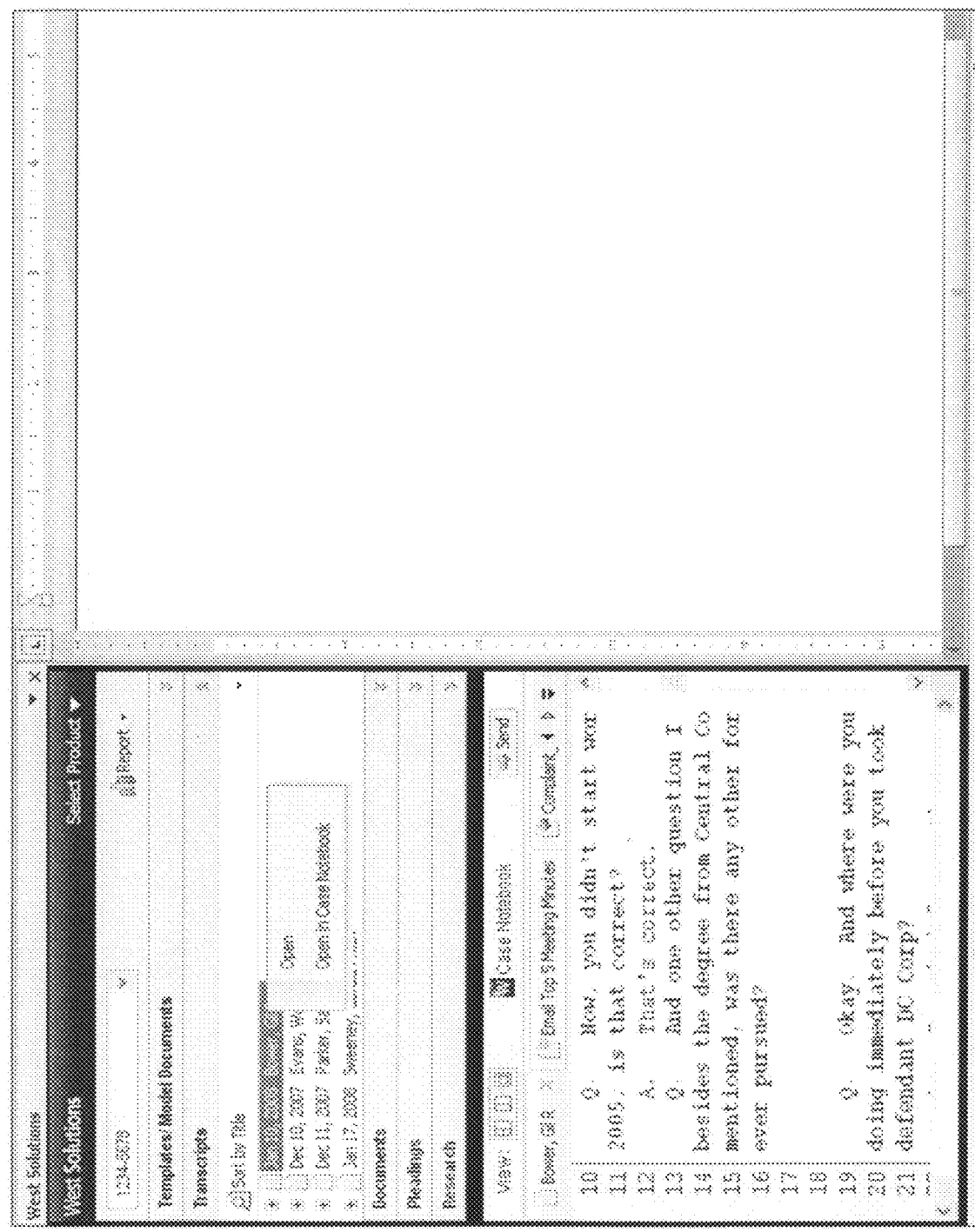
FIG. 11 is a screen shot associated with a user-selected control in conjunction with the present invention.

FIG. 12 illustrates a screen shot in which a user has opened a word processor for editing a document shown in the right-hand pane (corresponds to 1392 region of UI 139 of FIG. 1) and within left-hand panes the user has access to ISP solution functionality (corresponds to 1393 region of UI 139 of FIG. 1). In this instance, the user has selected Transcripts and is presented with a list of available transcripts to open including opening into Case Notebook.

Figure 13:
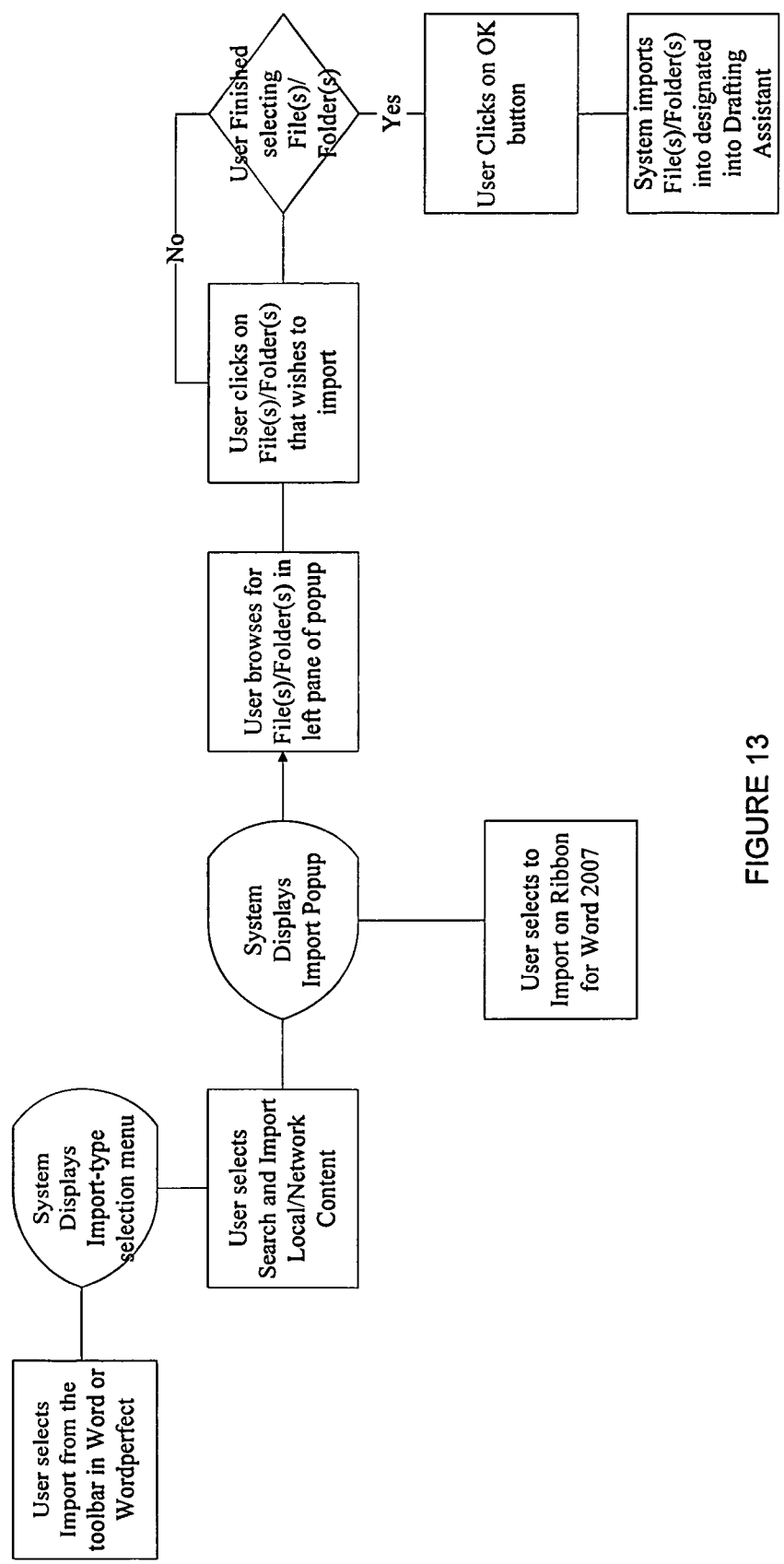

FIGS. 13 and 14A and 14B, illustrate workflows for importing files and folders into the LSS including browsing capabilities. The Drafting Assistant System includes an organizational group labeled "Templates/Model Documents" for storing documents not originating in Case Notebook. Users will have access to Templates/Model Documents even if they do not subscribe to Case Notebook. Folders and Content contained within Templates/Model Documents will be the same regardless of which matter a User has selected, or even if a User has not selected a matter from Case Notebook. The default folders for Templates/Model Documents are as follows: Model Documents, Language, West Templates. Where a firm makes networked materials available via Repository functionality, Users shall have both personal and firm folders and documents. Default firm folders are as follows: Model Documents, Language, West Templates. In a network environment, default personal folders are as follows: Model Documents, Language. All folders and content contained within Templates/Model Documents will be stored locally on the User's computer—either hard drive or network drive. All Users will have the ability to perform functions on network documents and folders.

Figure 15:
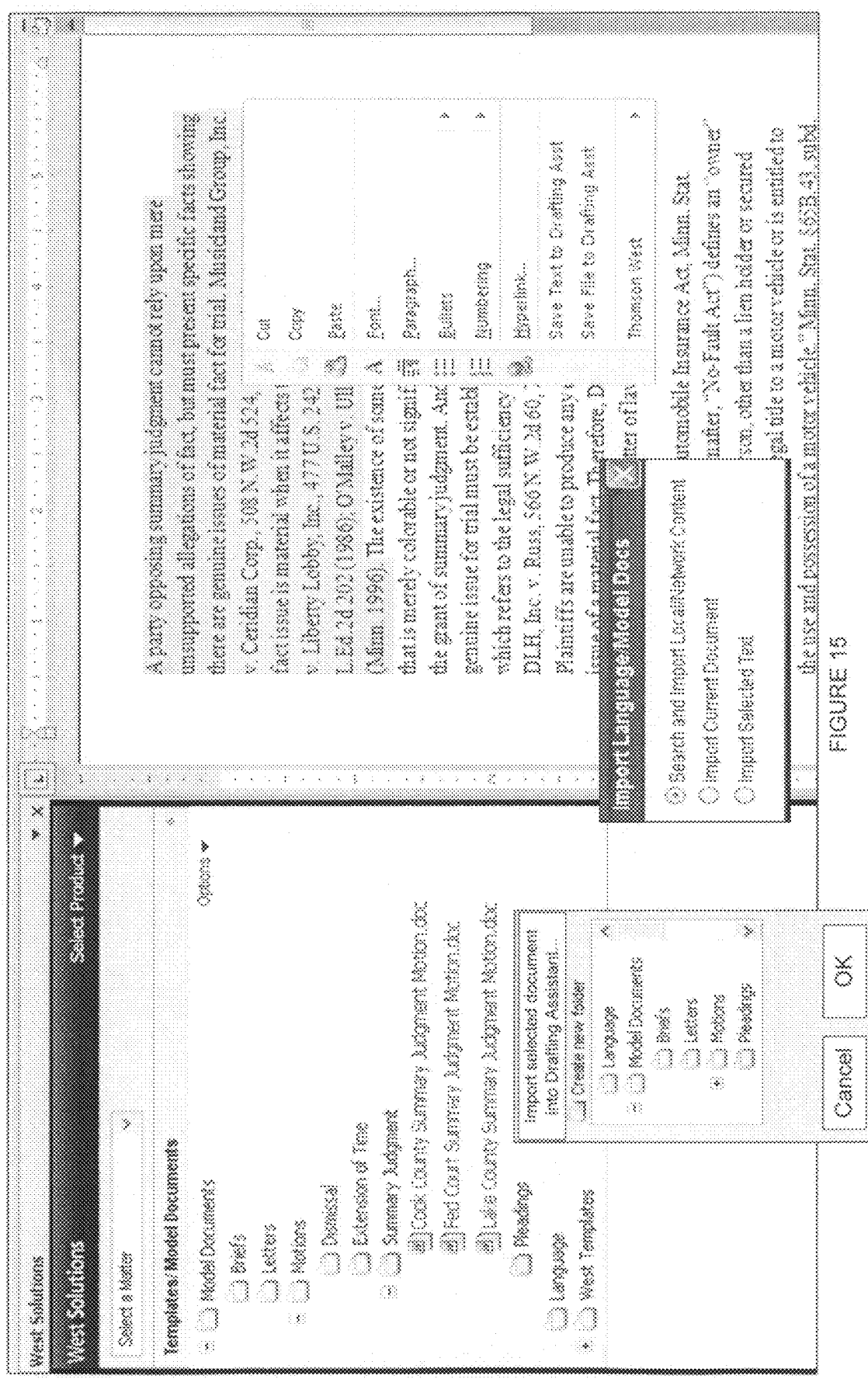
FIG. 15 is a screen shot representing a control and search and import aspect of the present invention.

Users may access Import by: clicking on Import Documents in the Ribbon in Word 2007; clicking on the Import Documents button in the Toolbar in earlier versions of Word and WordPerfect; selecting Import Document from the pull-down menu in the Container; or context-sensitive right-click menu. With reference to FIG. 15, If Import is accessed via the Ribbon/Toobar/Pulldown, the User can select from the following options: Search and Import Local/Network Content; Import Current Document; or Import Selected Text. Access can also be via the Toolbar, Container, or dialog.

Figure 16:
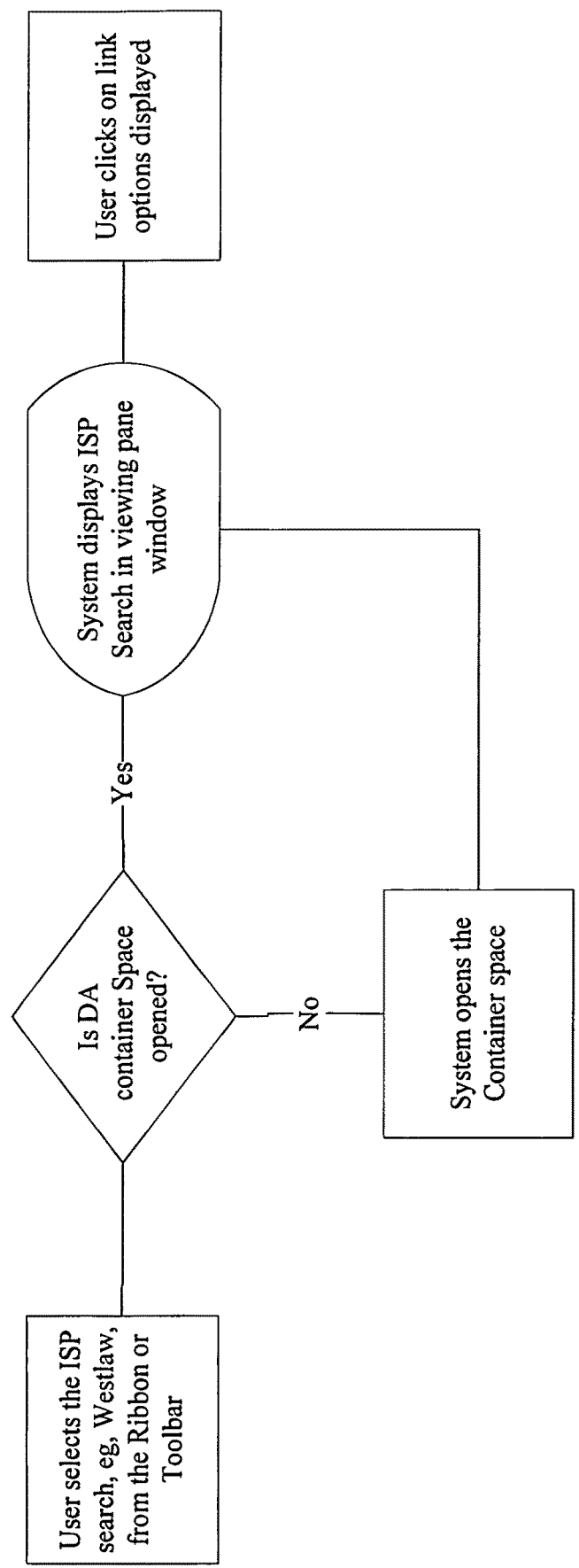
FIGS. 16 and 17 are a workflow and screen shot illustrating a user selected ISP search aspect of the present invention.
Figure 17:
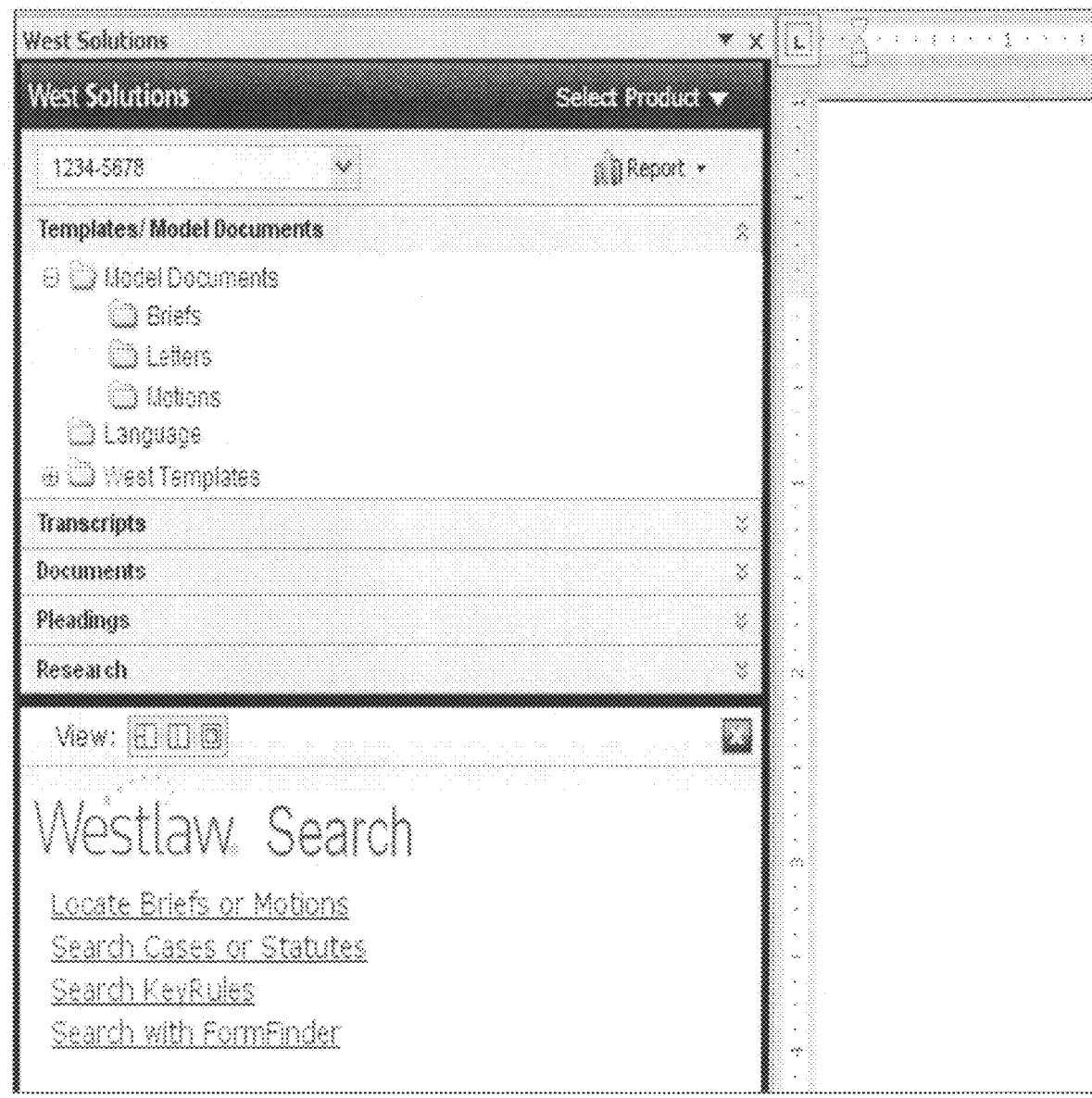
Figure 18:
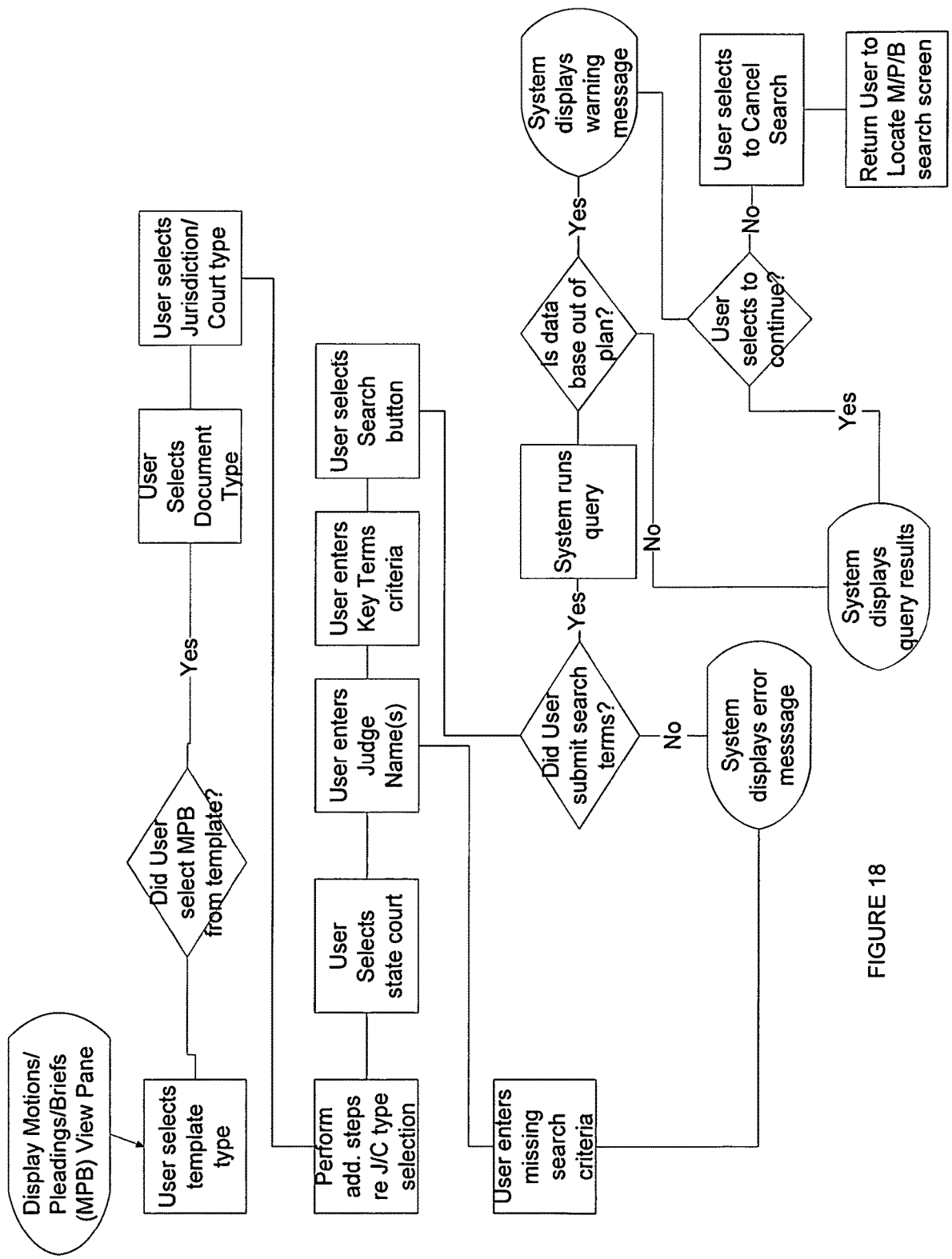
Figure 19:
Figure 21A:
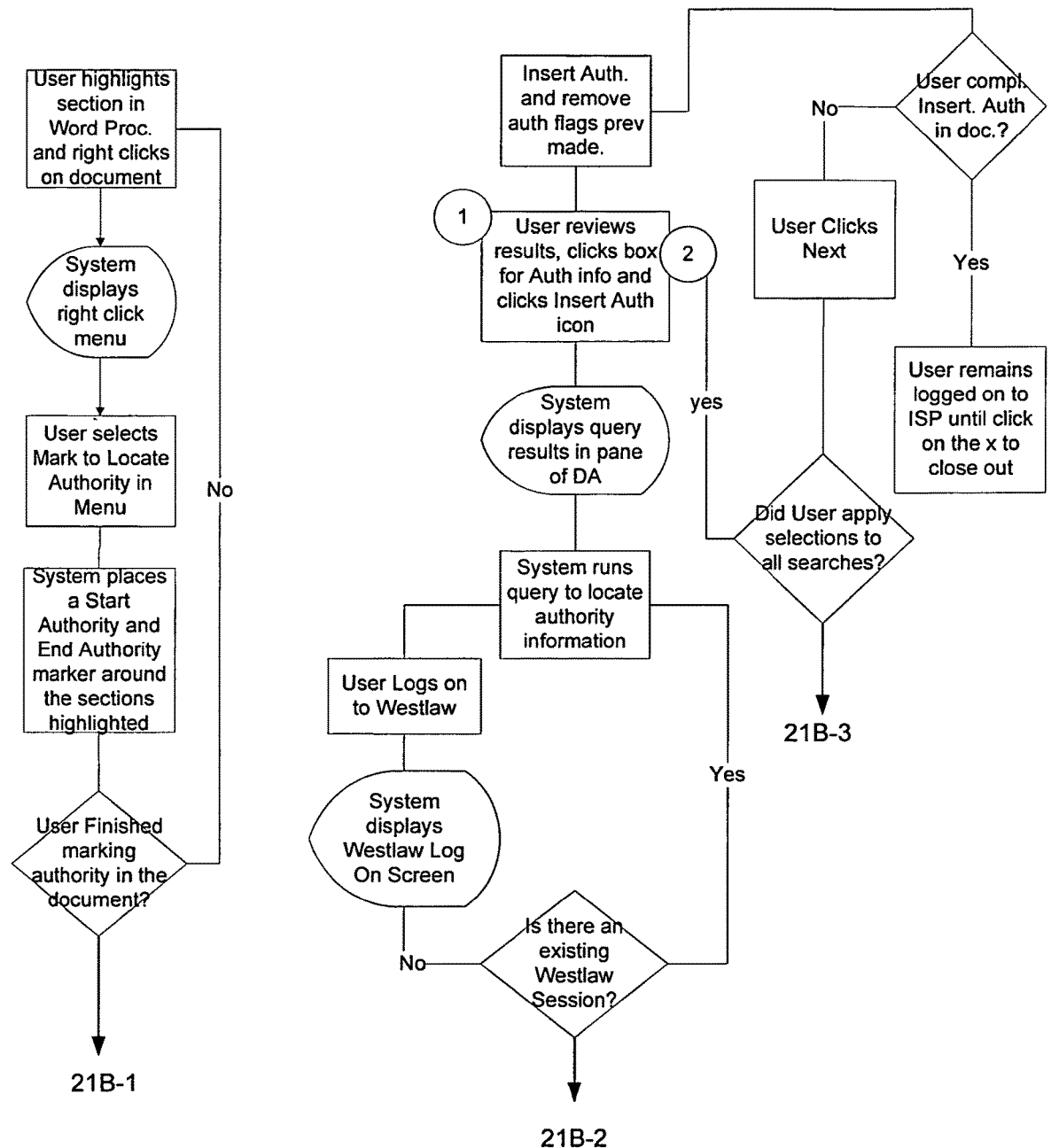
FIGS. 21A through 26 are a workflow and screen shots illustrating the Locate Authority UI and search aspect of the present invention.
Figure 21B:
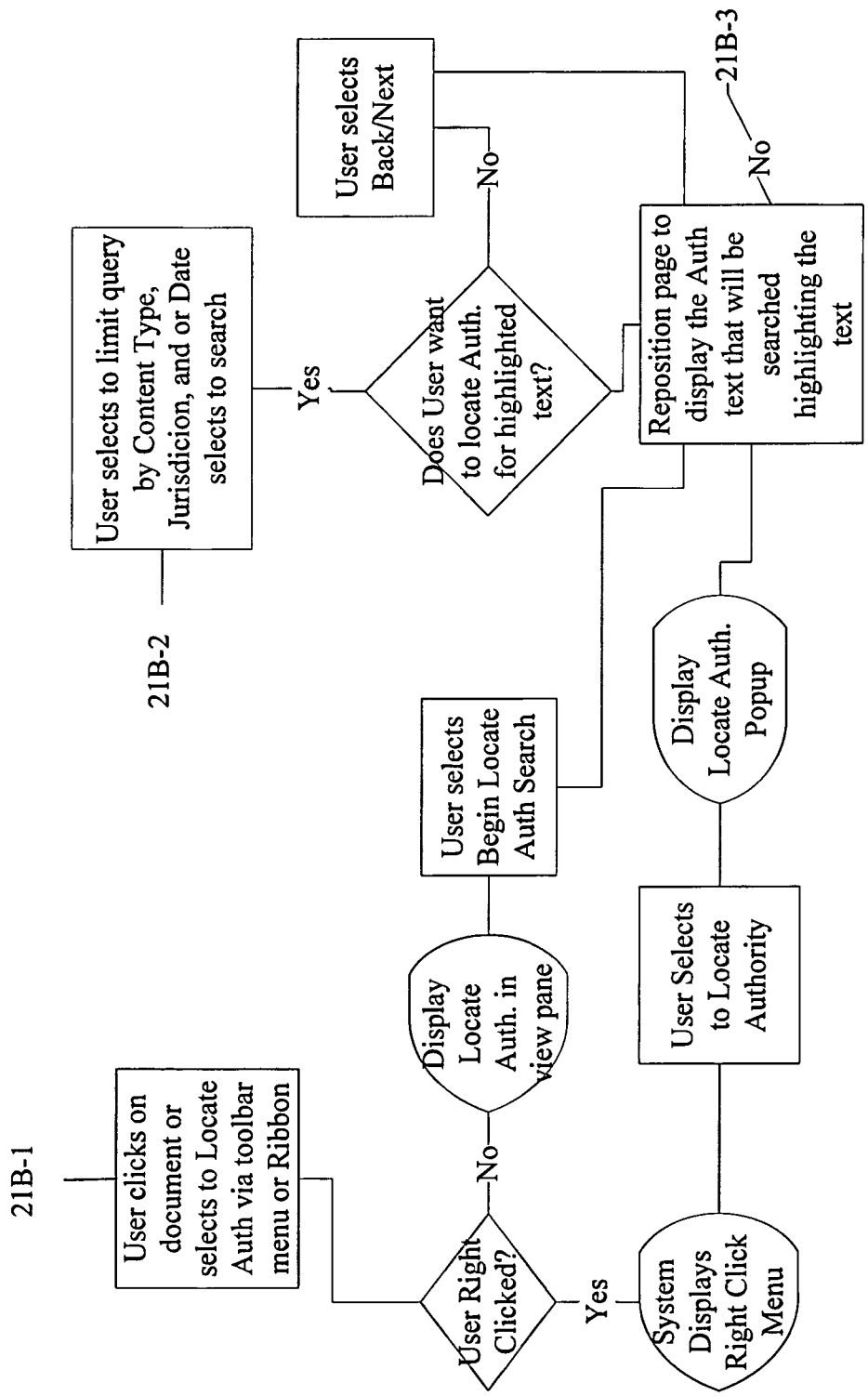

FIGS. 16-20 relate to a user performing searching functions outside the word processing application but within the context and UI 139 of the combined experience. FIG. 16 describes the process by which a user selects a function, e.g., ISP search—in this example West Solutions, Westlaw Search. The user may be presented with a logon screen to access the ISP search services and/or content. This may depend on an existing subscription to the individual or at the firm level. Preferences associate with the user's account with the ISP may also be implemented. The user experience with respect to the ISP aspect is preferably viewed as seamless and consistent within the host word processing application. FIG. 18 illustrates an exemplary workflow associated with a user selecting the "Locate Briefs or Motions" link in the Westlaw Search pane of FIG. 17 and is self-explanatory. FIGS. 19 and 20 illustrate UI's, and in particular the IIT region 1393 of UI 139 of FIG. 1, associated with inputting KeyRules search criteria, FIG. 19, and displaying search results, FIG. 20.

Figure 22:
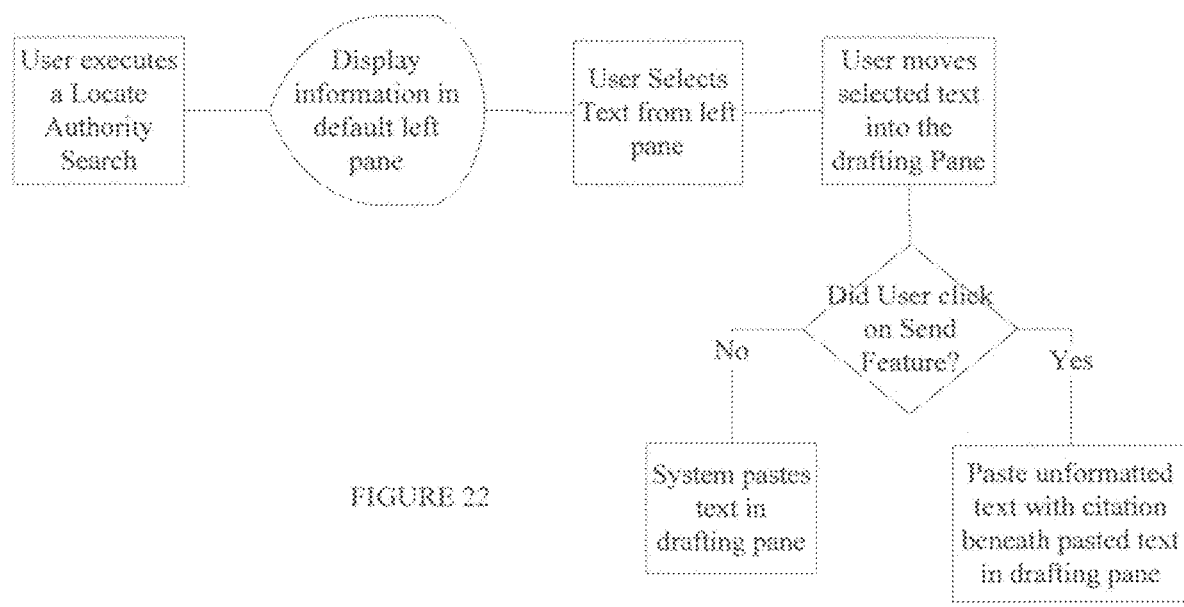
Figure 23:
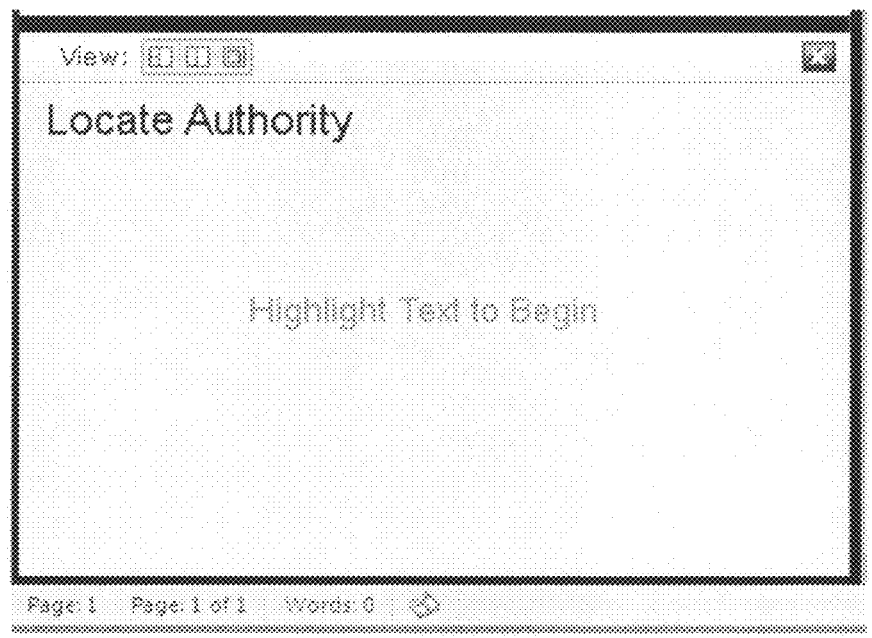
Figure 24:
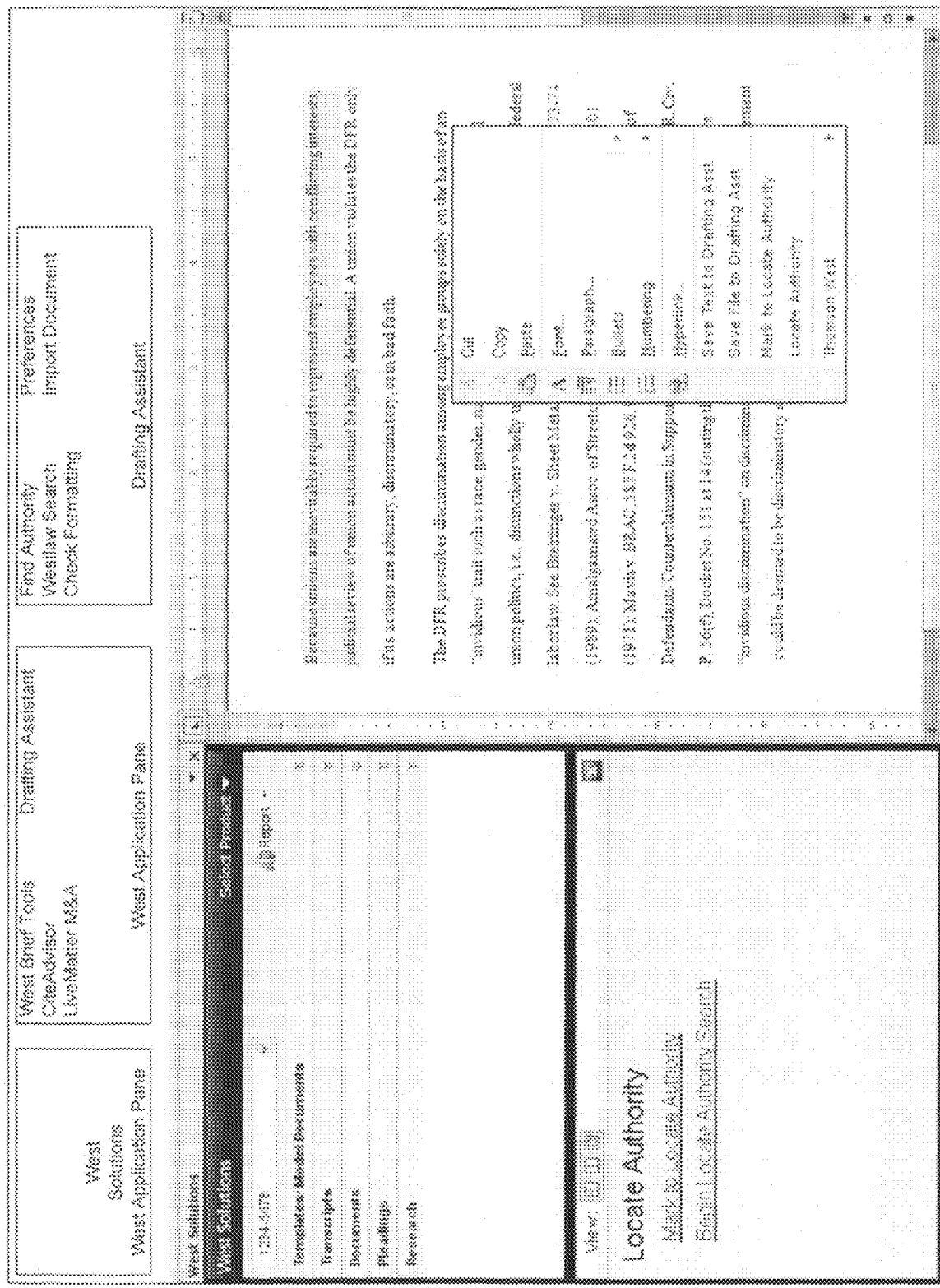
Figure 25:
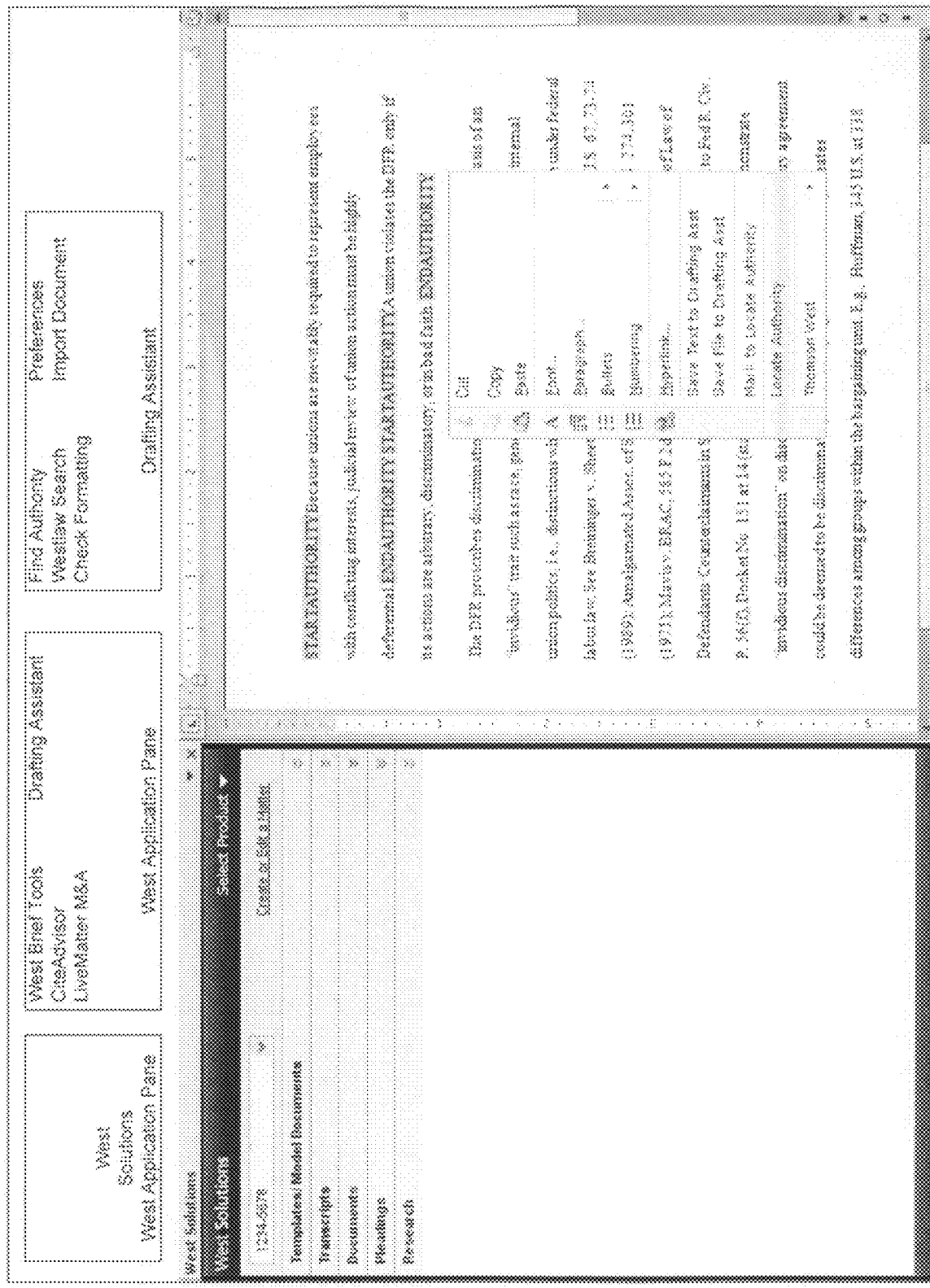
Figure 26:
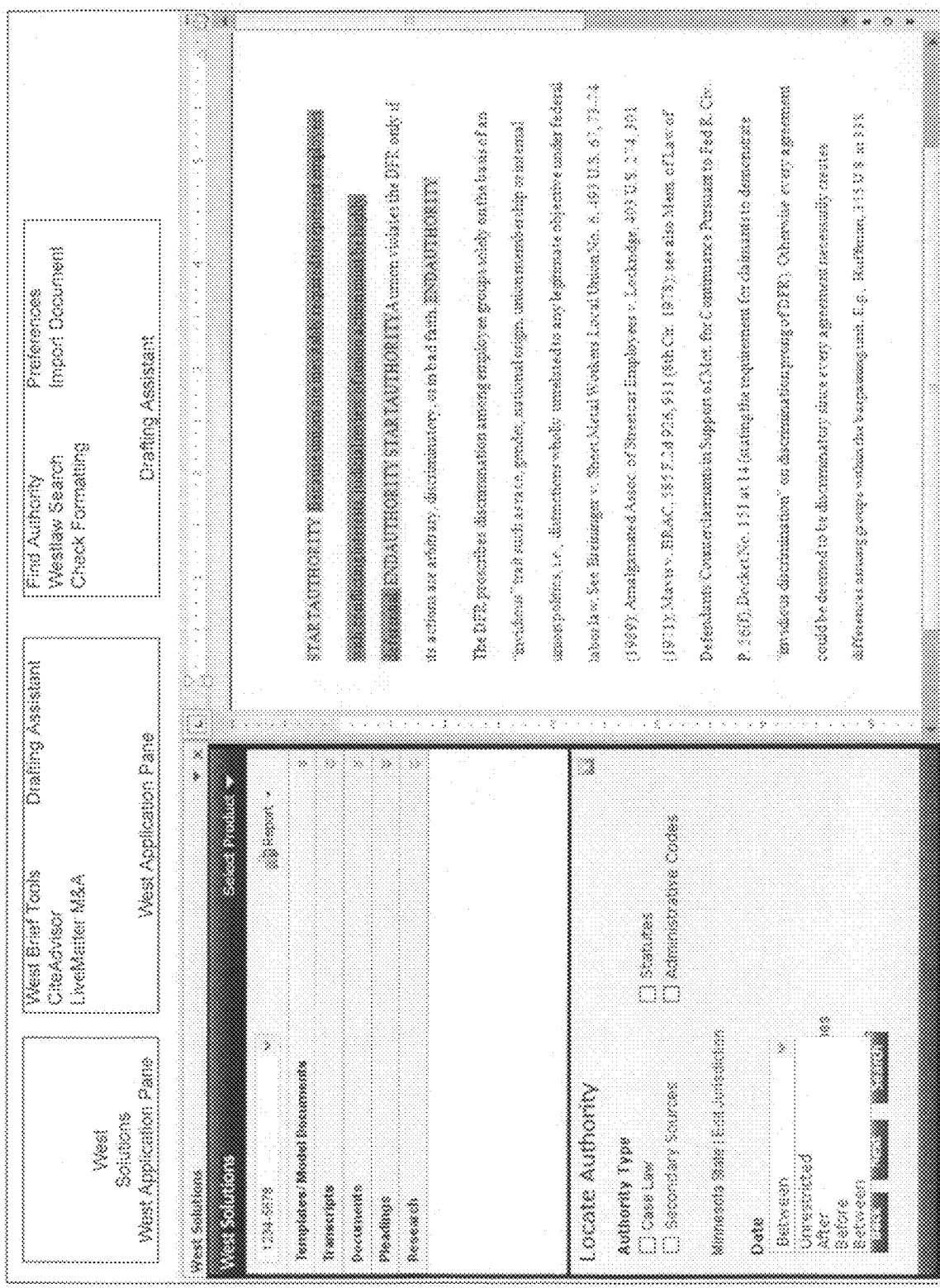
Figure 27A:
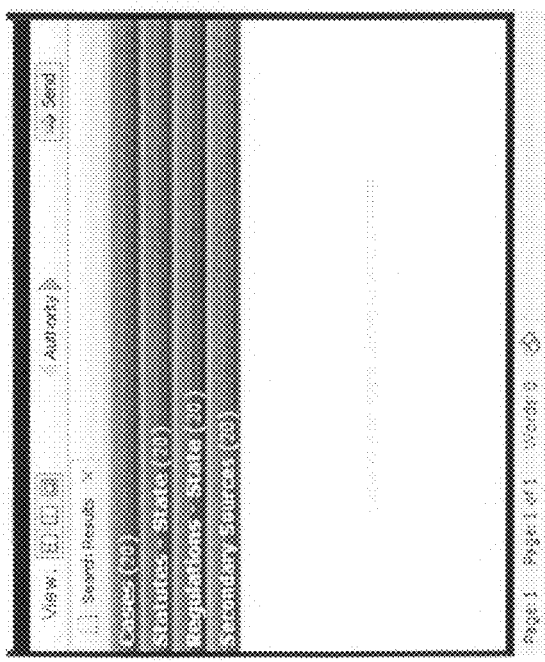
FIGS. 27A-27D illustrate a series of screen shots illustrating a search results screen resulting from processing the present invention.
Figure 27B:
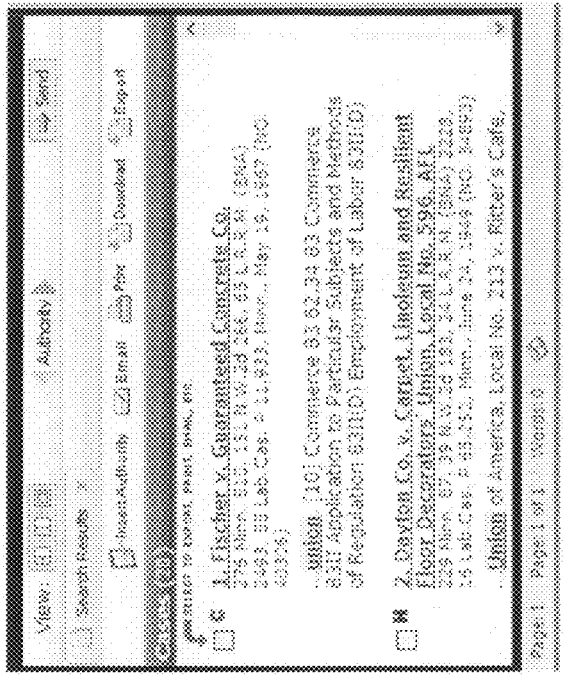
Figure 27C:
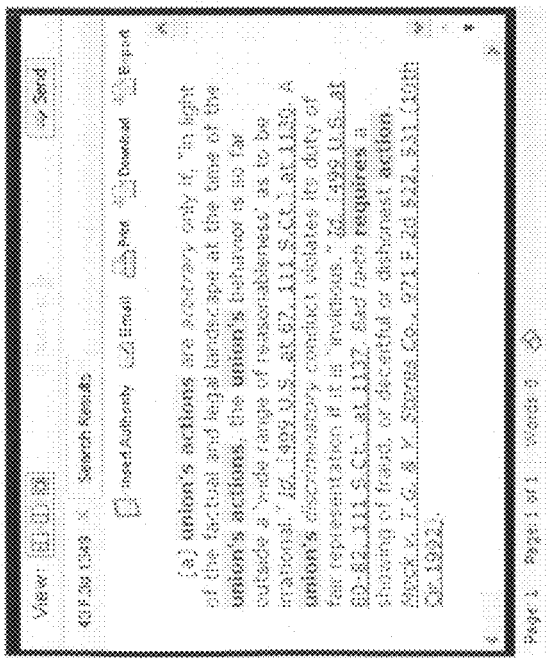
Figure 27D:
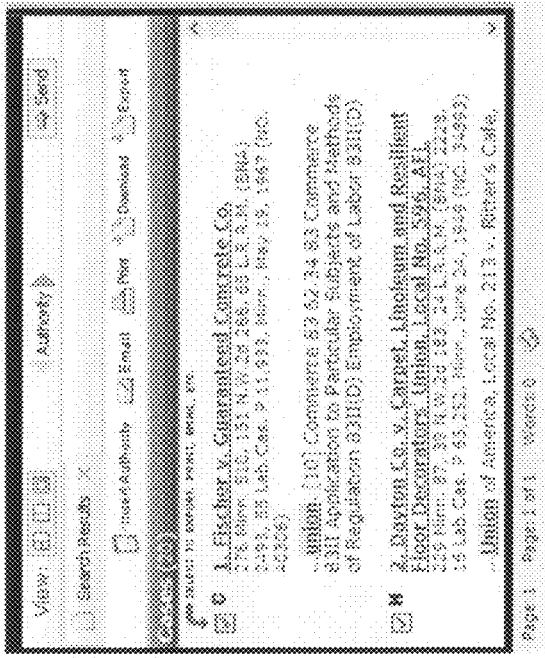

FIGS. 21 through 27 relate to a user's ability to highlight sections of text from an open document in the word processing application and to perform a search based on the present invention to return useful search results for use in preparing the working document, including incorporating excerpts from the researched authority. FIGS. 21A and 21B illustrate a workflow in which a user highlights a section of text in the word document, e.g., document open in right-pane region 1392 of UI 139, in order to search on the terms of interest in the search IIT region 1393 of UI 139. The flow as represented in the figures explains the process. FIG. 22 is a workflow that illustrates the process for a user to, after performing a search using the information integrated tools and resources available in region 1393, select text from the document/authority displayed in region 1393 for "copying and pasting" into the word processor document in region 1392. FIG. 23 illustrates a UI presented to the user in IIT region 1393 and FIG. 24 illustrates a UI screen, UI 139, presented to a user for performing the process described above and in connection with FIGS. 21A-21B. The User shall have the ability to identify text in the document being drafted which may require citation to legal authority. The User shall have the ability to mark authority to visibly flag text requiring authority so that the User or the System can return later to provide the appropriate citation. The User shall have the ability at any time during drafting to launch a process that will use a Westlaw query to suggest legal authority for text flagged as requiring authority.

In this example, the user has highlighted the text "Because unions are inevitably required to represent employees with conflicting interests, judicial review of union action must be highly deferential" from the word processing document in the right-hand region 1392. The drafting assistant component of the system presents the user with "Mark to Locate Authority" tool to delineate the text to be searched for finding authority, e.g., case law or statutes stored in PDC 112. FIG. 24 shows the highlighted text as having the search delineated by the markers "STARTAUTHORITY" and "ENDAUTHORITY." A second text excerpt is also shown as having been marked. From the search dialog box in the viewing pane, the User shall have the ability to go to the next set of authority markers without performing a search by selecting the Next button. The user may then enter additional search criteria in the IIT region 1393 of UI 139, e.g., "Authority Type" (case law, secondary sources, statutes, and administrative codes) as well as "Date" and "Jurisdiction" criteria and restrictions. The user may then click on the "Begin Locate Authority Search" button to launch a search within the ISP. FIGS. 27A-27D illustrate the resulting search results screens associated with the Locate Authority process.

In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A non-transitory computer useable medium having a set of executable code for enabling electronic communications between a word processing program of a client access device and an information services provider system (ISP), the set of executable code comprising:
    (a) a first set of computer program code for operatively connecting to the word processing program;
    (b) a second set of computer program code for operatively connecting to the information services provider system;
    (c) a third set of computer program code for accepting a user search request initiated by a user of the word processing program;
    (d) a fourth set of computer program code for transmitting the user search request to the information services provider system;
    (e) a fifth set of computer program code for deriving a set of pseudo documents from a set of secondary documents, each pseudo document in the set of pseudo documents representing a version of a secondary document from the set of secondary documents and comprising a set of identified citations and a set of text segments from said secondary document in the set of secondary documents, each text segment in the set of text segments being associated with and immediately preceding a corresponding identification citation from the set of identified citations;
    (f) a sixth set of computer program code for receiving a set of search results, the set of search results comprising a primary set of case law search results and a secondary set of non-case law search results, the primary set of case law search results comprising a first set of case documents, the secondary set of non-case law search results comprising a referencing text document set, the referencing text document set comprising a case law citation set, the case law citation set comprising one or more citations from the set of identified citations in the set of pseudo documents and used to derive a set of referencing text results, and wherein the set of referencing text results comprises a second set of case documents used to supplement the primary set of case law search results; and
    (g) a seventh set of computer program code for displaying within the word processing program at least a portion of the second set of case documents from the set of referencing text results.

2. The non-transitory computer useable medium of claim 1 wherein the third set of computer program code comprises code for identifying a highlighted portion of text within the word processing program.

3. The non-transitory computer useable medium of claim 1 wherein the word processing program is one of Microsoft Word, and Corel WordPerfect.

4. The non-transitory computer useable medium of claim 1 wherein the set of referencing text results comprises case law.

5. The non-transitory computer useable medium of claim 1 wherein the set of search results comprises a primary set of case law results derived from an ISP case law database.

6. The non-transitory computer useable medium of claim 5 wherein seventh set of computer program code further comprises computer program code for combining the set of referencing text results and the primary set of case law results.

7. The non-transitory computer useable medium of claim 1 wherein the computer useable medium comprises a memory within the information services provider system and further comprises:
    an eighth set of computer program code for receiving from the ISP the first set of computer program code, the second set of computer program code, the third set of computer program code, the fourth set of computer program code, the sixth set of computer program code, and the seventh set of computer program code at the client access device; and
    a ninth set of computer program code for installing at the client access device the first set of computer program code, the second set of computer program code, the third set of computer program code, the fourth set of computer program code, the sixth set of computer program code, and the seventh set of computer program code on the client access device.

8. A computer-implemented method for enabling electronic communications between a word processing program operating on a client access device and a computer-based information services provider system (ISP), the method comprising:
    (a) operatively connecting to a word processing program operating on a client access device;
    (b) operatively connecting to an ISP;
    (c) accepting a user search request initiated by a user of the word processing program;
    (d) transmitting the user search request to the ISP;
    (e) receiving a set of search results, the set of search results comprising a primary set of case law search results and a secondary set of non-case law search results, the primary set of case law search results comprising a first set of case documents, the secondary set of non-case law search results comprising a referencing text document set, the referencing text document set comprising a set of pseudo documents derived from a set of secondary documents, each pseudo document in the set of pseudo documents representing a version of a secondary document from the set of secondary documents and comprising a set of identified citations and a set of text segments from said secondary document in the set of secondary documents, each text segment in the set of text segments being associated with and immediately preceding a corresponding identification citation from the set of identified citations, the referencing text document set comprising a case law citation set, the case law citation set used to derive a set of referencing text results, and wherein the set of referencing text results comprises a second set of case documents used to supplement the primary set of case law search results; and (f) receiving for display within a user interface of the word processing program at least a portion of the second set of case documents from the set of referencing text results.

9. The method of claim 8 wherein accepting a user search request comprises identifying a highlighted portion of text within a document associated with the word processing program.

10. The method of claim 8 wherein the word processing program is one of Microsoft Word, and Corel WordPerfect.

11. The method of claim 10 wherein the set of referencing text results comprises case law.

12. The method of claim 10 wherein the set of search results further comprises a primary set of case law results derived from an ISP case law database.

13. The method of claim 12 further comprising combining the set of referencing text results and the primary set of case law results.

14. The method of claim 10 further comprising:
(g) receiving from the ISP a set of computer program code at the client access device, the set of computer program code adapted to execute on the client access device to perform in whole or in part the steps of (a)-(f); and
(h) installing the set of computer program code on the client access device.

15. A client access device comprising:
a processor adapted to execute code;
a memory for storing executable code;
a word processing program executed by the processor;
a database comprising a set of pseudo documents derived from a set of secondary documents, each pseudo document in the set of pseudo documents representing a version of a secondary document from the set of secondary documents and comprising a set of identified citations and a set of text segments from said secondary document in the set of secondary documents, each text segment in the set of text segments being associated with and immediately preceding a corresponding identification citation from the set of identified citations;
means for establishing electronic communications with an information services provider system (ISP) having a first database having a primary set of documents;
a first set of computer program code for operatively connecting to the word processing program;
a second set of computer program code for operatively connecting to the information services provider system;
a third set of computer program code for accepting a user search request initiated by a user of the word processing program;
a fourth set of computer program code for transmitting data derived from the user search request to the information services provider system;
a fifth set of computer program code for receiving a set of search results, the set of search results comprising a primary set of case law search results and a secondary set of non-case law search results, the primary set of case law search results comprising a first set of case documents, the secondary set of non-case law search results comprising a referencing text document set, the referencing text document set comprising a case law citation set, the case law citation set comprising one or more citations from the set of identified citations in the set of pseudo documents and used to derive a set of referencing text results, and wherein the set of referencing text results comprises a second set of case documents used to supplement the primary set of case law search results; and
a sixth set of computer program code for receiving for display within a user interface of the word processing program at least a portion of the second set of case documents from the set of referencing text results.

16. The device of claim 15 wherein the third set of computer program code comprises code for identifying a highlighted portion of text within a document associated with the word processing program.

17. The device of claim 15 wherein the word processing program is one of Microsoft Word, and Corel WordPerfect.

18. The device of claim 15 wherein the set of referencing text results comprises case law.

19. The device of claim 15 wherein the set of search results further comprises a primary set of case law results obtained from the ISP first database.

20. The device of claim 19 wherein the sixth set of computer program code further comprises computer program code for combining the set of referencing text results and the primary set of case law results.

21. The device of claim 15 further comprising:
a seventh set of computer program code for receiving from the ISP the first set of computer program code, the second set of computer program code, the third set of computer program code, the fourth set of computer program code, the fifth set of computer program code, and the sixth set of computer program code at the client access device; and
a eighth set of computer program code for installing the first set of computer program code, the second set of computer program code, the third set of computer program code, the fourth set of computer program code, the fifth set of computer program code, and the sixth set of computer program code on the client access device.

22. The device of claim 15 wherein the sixth set of computer program code includes computer program code for receiving for display within a user interface of the word processing program at least a subset of the primary set of documents and at least a portion of the set of referencing text results.

23. The device of claim 22 wherein the subset of the primary set of documents and at least a portion of the set of referencing text results is ranked with respect to relevancy to data associated with the user search request.

24. The device of claim 15 wherein the sixth set of computer program code includes computer program code for receiving for display within a user interface of the word processing program ranked subsets of each of the primary set of documents and the set of referencing text results.

25. The device of claim 15 wherein the referencing text results comprise case law derived from case citations contained in non-case law referencing text documents identified in a database other than the first database.

26. A network-based, computer-implemented information services provider system (ISP) having a set of executable code for enabling data exchange with a word processing program remotely operating on a client access device, the system comprising:
- a processor adapted to execute code;
- a memory for storing executable code;
- a first database accessible by the processor and having stored therein a primary set of documents;
- a second database accessible by the processor and having stored therein set of pseudo documents derived from a set of secondary documents, each pseudo document in the set of pseudo documents representing a version of a secondary document from the set of secondary documents and comprising a set of identified citations and a set of text segments from said secondary document in the set of secondary documents, each text segment in the set of text segments being associated with and immediately preceding a corresponding identification citation from the set of identified citations;
- a first set of computer program code adapted to operatively connect to the word processing program;
- a second set of computer program code adapted to receive search data associated with a user search request initiated by a user of the word processing program;
- a third set of computer program code adapted to generate a set of search results, the set of search results comprising a set of primary case law search results from the first database and a set of secondary non-case law search results comprising a referencing text document set derived from the second database, the referencing text document set comprising a case law citation set, the case law citation set comprising one or more citations from the set of identified citations in the set of pseudo documents and used to derive a set of referencing text results, and wherein the set of referencing text results comprises a second set of case documents used to supplement the set of primary case law search results; and
- a fourth set of computer program code adapted to transmit for display within a user interface of the word processing program at least a portion of the set of search results including at least a portion of the second set of case documents from the set of referencing text results.

27. The system of claim 26 wherein the word processing program is one of Microsoft Word, and Corel WordPerfect.

28. The system of claim 26 further comprising a fifth set of computer program code adapted to combine the set of referencing text results and the set of primary search results.

29. The system of claim 28 further comprising:
- a sixth set of computer program code adapted to transmit the first set of computer program code, the second set of computer program code, the third set of computer program code, and the fourth set of computer program code to the client access device.

30. The system of claim 28 further comprising:
- a seventh set of computer program code adapted to rank with respect to relevancy to data associated with the user search request at least a portion of one or both of the primary set of search results and the set of referencing text results.

31. The system of claim 28 wherein the seventh set of computer program code includes computer program code for transmitting for display within a user interface of the word processing program ranked subsets of each of the primary set of search results and the set of referencing text results.

32. The system of claim 28 further comprising:
- an eight set of computer program code adapted to enable electronic communications with a secondary source of documents comprising referencing text documents;
- a ninth set of computer program code adapted to cause a search of the secondary source of referencing text documents based on the user search request; and
- a tenth set of computer program code adapted to receive from the secondary source a set of referencing text documents from which the set of referencing text results are derived.

33. The system of claim 32 wherein the referencing text documents consist of documents other than case law and the referencing text results comprises case law derived from citations included in one or more of the set of referencing text documents.

* * * * *